US012234778B2

(12) United States Patent
Murray et al.

(10) Patent No.: US 12,234,778 B2
(45) Date of Patent: Feb. 25, 2025

(54) FLOW-METERING FUEL SYSTEMS AND RELATED METHODS

(71) Applicants: General Electric Company, Schenectady, NY (US); GE Avio S.r.l., Turin (IT)

(72) Inventors: Michael Joseph Murray, West Chester, OH (US); Mirko Gernone, Bari (IT)

(73) Assignees: General Electric Company, Evendale, OH (US); GE Avio S.r.l., Turin (IT)

( * ) Notice: Subject to any disclaimer, the term of this patent is extended or adjusted under 35 U.S.C. 154(b) by 0 days.

(21) Appl. No.: 18/308,435

(22) Filed: Apr. 27, 2023

(65) Prior Publication Data

US 2024/0084741 A1    Mar. 14, 2024

(30) Foreign Application Priority Data

Sep. 9, 2022   (EP) ..................................... 22194974

(51) Int. Cl.
| | |
|---|---|
| *F02C 9/26* | (2006.01) |
| *F02C 7/22* | (2006.01) |
| *F02C 9/28* | (2006.01) |
| *F02C 7/232* | (2006.01) |

(52) U.S. Cl.
CPC .............. *F02C 9/263* (2013.01); *F02C 7/222* (2013.01); *F02C 9/28* (2013.01); *F02C 7/232* (2013.01)

(58) Field of Classification Search
CPC ..................................................... F02C 9/263
See application file for complete search history.

(56) References Cited

U.S. PATENT DOCUMENTS

| | | |
|---|---|---|
| 4,030,523 A | 6/1977 | Cram et al. |
| 5,146,941 A | 9/1992 | Statler |
| 5,368,273 A | 11/1994 | Dante |
| 7,036,318 B1 | 5/2006 | Munson, Jr. |
| 9,897,041 B2 | 2/2018 | Hoffjann et al. |

(Continued)

FOREIGN PATENT DOCUMENTS

| | | |
|---|---|---|
| EP | 1005607 | 6/2000 |
| EP | 2112363 | 10/2009 |

(Continued)

OTHER PUBLICATIONS

European Patent Office, "Extended European Search Report," issued in connection with European Patent Application No. 22194974.6, dated Feb. 24, 2023, 7 pages.

*Primary Examiner* — Todd E Manahan
*Assistant Examiner* — Alyson Joan Harrington
(74) *Attorney, Agent, or Firm* — HANLEY, FLIGHT & ZIMMERMAN, LLC

(57) ABSTRACT

Flow-metering fuel systems and related methods are disclosed. An example apparatus includes a pipe defining a flow path for fuel, the pipe fluidly coupled to a combustor, a first portion of the pipe having a first cross-sectional area, a second portion of the pipe having a second cross-sectional area smaller than the first cross-sectional area, the second portion downstream of the first portion, and an actuator to adjust a flow rate of the fuel in the pipe based on a first pressure of the fuel in the first portion of the pipe, a second pressure of the fuel in the second portion of the pipe, and a temperature of the fuel.

20 Claims, 14 Drawing Sheets

(56) References Cited

U.S. PATENT DOCUMENTS

2004/0011050 A1   1/2004  Inoue
2007/0251952 A1  11/2007  Paradise
2016/0108818 A1*  4/2016  Fletcher .................. F02C 7/222
                                                      703/1
2019/0106972 A1   4/2019  Sanborn et al.

FOREIGN PATENT DOCUMENTS

GB        2504568      2/2014
GB        2587685      4/2021

* cited by examiner

FLOW-METERING FUEL SYSTEMS AND RELATED METHODS

This patent claims the benefit of European Patent Application No. 22194974.6, which was filed on Sep. 9, 2022. European Patent Application No. 22194974.6 is hereby incorporated herein by reference in its entirety. Priority to European Patent Application No. 22194974.6 is hereby claimed.

FIELD OF THE DISCLOSURE

This disclosure relates generally to gas turbines and, more particularly, to flow-metering fuel systems and related methods.

BACKGROUND

In recent years, gas turbine engines have utilized mixtures of hydrogen gas and conventional fuels because of the advantages hydrogen gas provides. Specifically, hydrogen is an abundantly available element that has beneficial properties for combustion in gas turbine engines, such as reduced carbon emissions, lower fuel consumption (pounds per hour (pph)), greater energy production, light weight, and high combustion rate and temperature. During combustion of the mixture of hydrogen gas and conventional fuels, chemical energy and thermal energy are converted into mechanical energy. The mechanical energy produced as a result of the combustion can drive downstream turbine blades and provide propulsion to an aircraft or drive a shaft of a generator that produces electric current.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
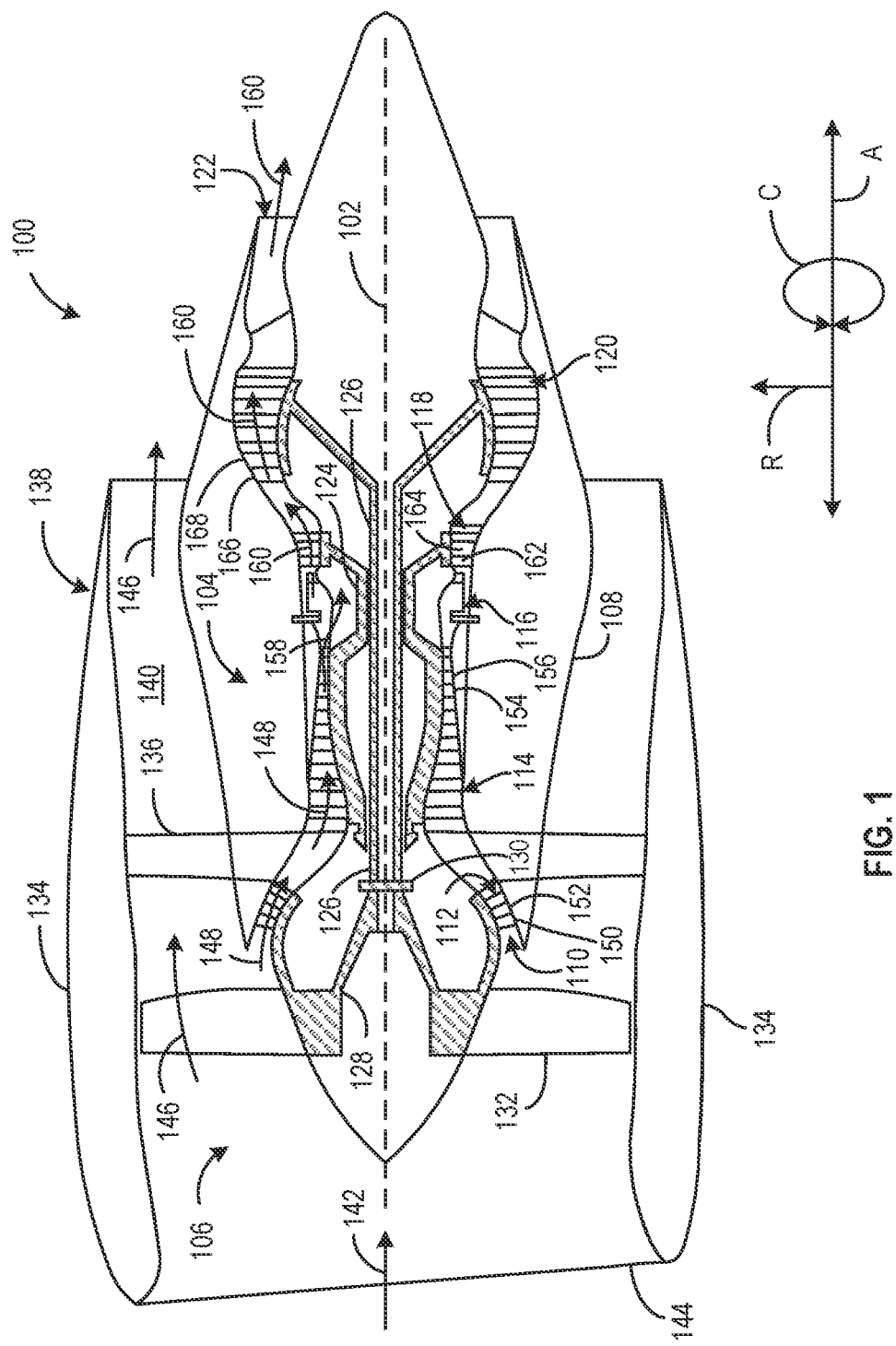
FIG. 1 illustrates a schematic cross-sectional view of a prior art example of a turbofan engine.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," "communicatively coupled," and variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Hydrogen is an abundant fuel source that has additional beneficial properties for combustion in gas turbine engines, such as a high combustion rate and temperature, which can increase an efficiency of the gas turbine engine. Gas turbine engines produce power and/or mechanical drive for aeronautics, marine applications, gear boxes, offshore power generators, terrestrial power plants, etc. Gas turbine engines can utilize hydrogen gas in addition to, or instead of, other conventional fuels to convert thermal and chemical energy to mechanical energy via combustion. Specifically, a gas turbine engine that utilizes hydrogen gas during combustion can incrementally increase a quantity of energy produced compared to a conventional gas turbine engine that does not utilize hydrogen gas. Further, utilization of hydrogen as the combusting fuel within gas turbines reduces harmful carbon emissions, which is a focus of power producers given the emission regulations that have been implemented by legislation.

However, the utilization of hydrogen as fuel presents unique challenges compared to the utilization of conventional hydrocarbons. With conventional hydrocarbons, which are typically in the form of an incompressible fluid, there can be a delay between the determination of a fuel flow rate to be implemented and the actual implementation or realization of the determined fuel flow rate in the fuel system. As hydrocarbon fuel is typically in an incompressible form, this delay is amplified in hydrogen fuel systems due to the compressibility of hydrogen when in a gaseous state or a supercritical state.

In some known implementations, a sonic valve is utilized to choke the flow of the fuel and ensure that the flow rate is sonic (e.g., exceeds the speed of sound) through a metering orifice. When the pressure across some orifice area is regulated, such implementations can give a fairly repeatable orifice area to flow relationship. In some known implementations, a variable area valve to control the flow of the fuel with a regulated pressure difference. In such implementations, rather than maintaining a choked (e.g., sonic) pressure ratio, the pressure is regulated with a separate valve. Similar to the sonic valve, the regulated pressure ensures a repeatable flow-to-area relationship at a given density. However, to regulate the pressure and create the choked flow, an inlet and outlet pressure ratio is maintained to obtain a mass flow that is constant for a given valve opening. Accordingly, maintaining such a pressure ratio and enabling the pressures to be high enough to create the choked flow increases operational difficulties as well as a pressure burden on the fuel system. Additionally, such pressures result in an increased pump size as well as an increased power required to drive the pump.

Example flow-metering fuel systems and related methods are disclosed herein. An example fuel system disclosed herein includes a pipe to transport fuel to a combustor. The example pipe includes or defines a flow-metering section. As used herein, a "flow-metering section" includes a converging section and a diverging section downstream of the converging section. The converging section can define a first cross-sectional area upstream of a second cross-sectional area to cause the fuel to have a first pressure in a first portion of the pipe associated with the first cross-sectional area and a second pressure in a second portion of the pipe associated with the second cross-sectional area. Accordingly, the fuel encounters the venturi effect as the converging section causes the pressure of the fuel to be reduced between the first cross-sectional area and the second cross-sectional area.

The example fuel system also includes processor circuitry to compute a flow rate of the fuel in the pipe based on the first pressure and the second pressure. During transient power operations, the processor circuitry can determine whether the flow rate is within a threshold range of a desired flow rate. In response to the flow rate not being within the threshold range of the desired flow rate, the processor circuitry can determine a positional adjustment for a valve upstream of the flow-metering section and/or control an actuator to adjust the flow rate accordingly.

As a result, examples disclosed herein cause the fluid to encounter different pressures in different areas of the pipe to create an indication of a rate at which the fuel is flowing. Accordingly, the pressure of the fuel in the pipe need only be measured and not maintained at a certain ratio to enable accurate flow rate calculations. Moreover, examples disclosed herein cause the pipe and associated fuel system hardware to encounter reduced pressures during a flow rate computation as the flow rate need not be choked or have a regulated pressure through an orifice for a relationship associated with the cross-sectional area of the orifice to indicate a flow rate. Thus, examples disclosed herein minimize or otherwise reduce stress-related structural failures in the fuel system and/or minimize or otherwise reduce a cost of the fuel system by necessitating less structural support to contain such high pressures throughout the fuel pipe. Additionally, examples disclosed herein enable the fuel system to operate with a reduced quantity of dynamic parts (e.g., valves, etc.) needed to regulate the fluid pressure, which reduces a delay in obtaining a flow rate that matches a target flow rate.

In some examples, the flow-metering section defines an entirety of a flow path for the fuel through a certain area of the pipe. That is, the flow-metering section defines a portion of the fuel pipe. In some examples, when the flow-metering section defines the portion of the fuel pipe, the pipe includes another, smaller flow-metering section positioned within the first flow-metering section. In some examples, the flow-metering section defines a portion of the flow path for the fuel through a certain area of the pipe. For example, the flow-metering section can be positioned within and radially surrounded by an outer pipe body having a uniform cross-sectional area.

In some examples, flow-metering sections are positioned in parallel and in fluid connection with (e.g., fluidly coupled to) respective sections (e.g., zones, areas, etc.) of the combustor such that the flow rate of the fuel entering the respective sections of the combustor can be monitored and controlled individually. The example flow-metering fuel systems disclosed herein can be utilized with any compressible fluid. For example, the fluid can be in a gaseous state (e.g., gaseous hydrogen, natural gas, methane, air, etc.) and/or a supercritical state (e.g., supercritical hydrogen, supercritical carbon dioxide, etc.).

Referring now to the drawings, FIG. 1 is a schematic cross-sectional view of an example of a turbofan engine 100 that may incorporate various examples disclosed herein. As shown in FIG. 1, the turbofan engine 100 defines a longitudinal or axial centerline axis 102 extending therethrough for reference. In general, the turbofan engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gearbox 130 (i.e., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine engine 104. The nacelle 134 can be supported relative to the core turbine engine 104 by a forward mount 136. Furthermore, a downstream section 138 of the nacelle 134 can enclose an outer portion of the core turbine engine 104 to define a bypass airflow passage 140 therebetween.

As illustrated in FIG. 1, air 142 enters an intake or inlet portion 144 of the turbofan engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

In FIG. 1, the combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine engine 104 through the exhaust section 122 thereof.

Along with the turbofan engine 100, the core turbine engine 104 serves a similar purpose and sees a similar environment in land-based turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the turbofan engine 100 defines an axial direction A, a radial direction R, and a circumferential direction C. In general, the axial direction A extends generally parallel to the axial centerline axis 102, the radial direction R extends orthogonally outward from the axial centerline axis 102, and the circumferential direction C extends concentrically around the axial centerline axis 102.

Figure 2:
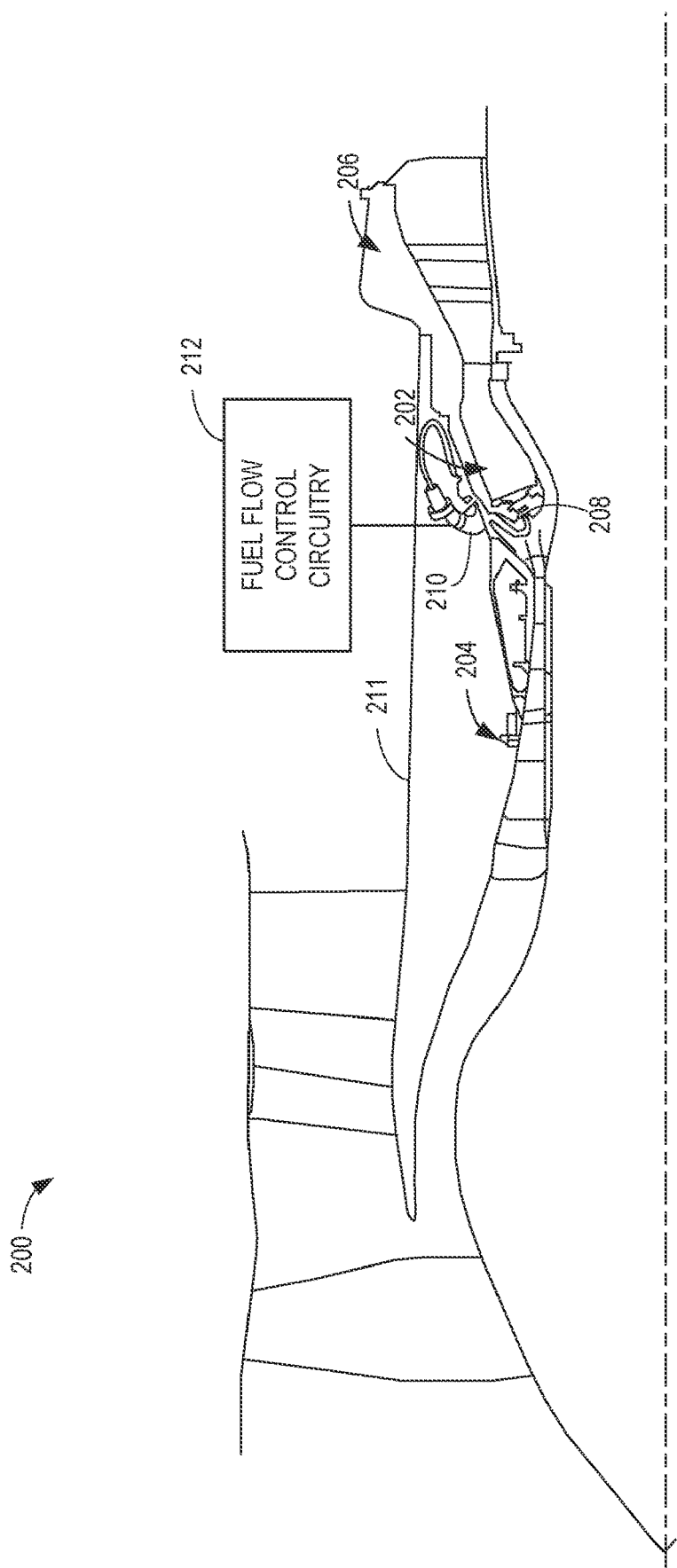
FIG. 2 illustrates a schematic cross-sectional view of an example gas turbine in accordance with the teachings disclosed herein.

FIG. 2 illustrates a schematic cross-sectional view of an example gas turbine 200 in accordance with the teachings disclosed herein. In FIG. 2, the gas turbine 200 includes a combustor 202 between a compressor section 204 and a turbine section 206. In FIG. 2, the combustor 202 includes nozzles 208 in connection with a fuel circuit 210 (e.g., a fluid line, a fuel duct, a fuel pipeline, etc.) that injects fuel (e.g., supercritical hydrogen, gaseous hydrogen, etc.) into the combustor 202. In some examples, the fuel circuit 210 is positioned in or around the compressor section 204 and/or the turbine section 206. In such examples, the fuel circuit 210 is positioned under a cowl and in a core 211 of the gas turbine 200 that surrounds the compressor section 204 and/or the turbine section 206. In FIG. 2, the gas turbine 200 can include any spool configuration with or without a geared fan. For example, the gas turbine 200 can include one or more spools. In some examples, the gas turbine 200 includes three spools such that a low pressure compressor and a fan have a first turbine section and a second turbine section, respectively. Furthermore, although the illustrated example of FIG. 2 includes the gas turbine 200, it should be understood that examples disclosed herein can be implemented in any fluid system, such as a thermal management bus, an engine architecture the utilizes centrifugal compressors, etc.

In FIG. 2, the gas turbine 200 includes fuel flow control circuitry 212 communicatively coupled to one or more actuator(s) and/or one or more sensor(s) associated with the fuel circuit 210. For example, the actuator(s) can be operatively coupled to at least one pump and/or at least one valve that affects a flow rate of the fuel provided to the combustor 202. Further, the sensor(s) can include a pressure sensor(s), a pressure differential sensor(s), a temperature sensor(s), a position sensor(s), and/or any other sensors associated with the gas turbine 200 or an associated vehicle (e.g., an aircraft). Accordingly, the sensor(s) can measure the pressure of the fuel in certain areas of the pipe as well as the temperature of the fuel to enable the fuel flow control circuitry 212 to compute the flow rate of the fuel. As such, when the flow rate deviates from a desired flow rate, the fuel flow control circuitry 212 can cause the actuator(s) to adjust the flow rate accordingly and, in turn, cause the gas turbine 200 to realize a desired power output. Additionally or alternatively, the fuel flow control circuitry 212 can determine the desired power output for the gas turbine 200 based on a power control signal or a signal from the throttle lever position sensor.

Figure 3:
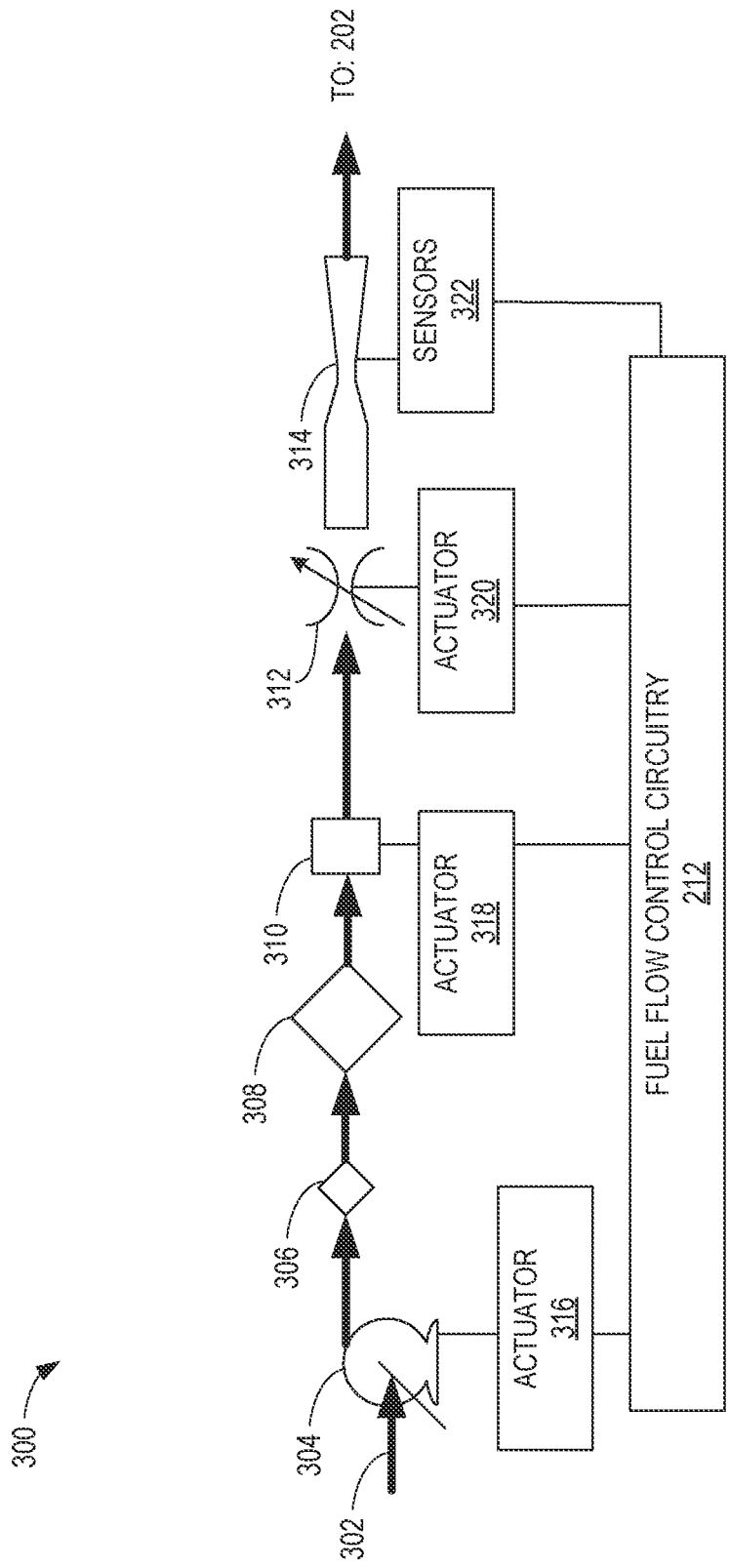
FIG. 3 is a first example schematic representation of a fuel system associated the example gas turbine of FIG. 2.

FIG. 3 is a first example schematic representation of a fuel system 300 associated with the fuel circuit 210 of the example gas turbine 200 of FIG. 2. In the illustrated example of FIG. 3, the fuel system 300 includes one or more fuel pipes 302 (e.g., conduits, ducts, etc.) that define a flow path for fuel to flow to the combustor 202 of FIG. 2. In FIG. 3, the flow path defined by the fuel pipe(s) 302 is indicated by arrows. Furthermore, the fuel system 300 includes a pump 304, a filter 306, a heat exchanger 308, a shutoff valve 310, and a metering valve 312. In some examples, the metering valve 312 is implemented by a spool-in-sleeve valve, a poppet valve, a gate valve, a ball valve, and/or a butterfly valve. In some examples, the shutoff valve 310 and/or the metering valve 312 is/are implemented by another type of valve.

In the illustrated example of FIG. 3, the fuel pipe(s) 302 define or include a flow-metering section 314 downstream of the metering valve 312. The flow-metering section 314 defines at least two different cross-sectional areas that cause fuel in the fuel pipes 302 to encounter different pressures corresponding to, or indicative of, a rate at which the fuel is flowing through the flow-metering section 314, as discussed in further detail below. Advantageously, the flow-metering section 314 can be positioned in the core 211 of the gas turbine 200 to obtain accurate measurements for flow rate calculations closer to the combustor 202 than known fuel metering systems, which require components that are unable to operate sufficiently in the core 211 (e.g., near the combustor 202) due to the temperatures created by the combustor 202.

In the illustrated example of FIG. 3, the fuel system 300 also includes sensors 322 to measure parameters associated with the fuel as well as engine operating parameters. The sensors 322 include a temperature sensor to measure a temperature of the fuel in the flow-metering section 314. Further, the sensors 322 include a first pressure sensor to measure a first pressure (e.g., a first fluid pressure) of the fuel at a first cross-sectional area defined by the flow-metering section 314 as well as a second pressure sensor to measure a second pressure (e.g., a second fluid pressure) of the fuel at a second cross-sectional area defined by the flow-metering section 314. In some examples, the sensors 322 include a differential pressure sensor to measure a pressure difference of the fuel flowing through the first cross-sectional area compared to the fuel flowing through the second cross-sectional area. Additionally, the sensors 322 can include any other sensors located elsewhere in the gas turbine 200 and/or in an associated vehicle (e.g., an aircraft). For example, the sensors 322 can include one or more position sensors to measure a throttle lever position corresponding to a desired power output of the gas turbine 200.

In some examples, the fuel flow control circuitry 212 determines a flow rate of the fuel in the fuel pipe(s) 302 based on the first pressure, the second pressure, the first cross-sectional area, the second cross-sectional area, and the temperature of the fuel in the flow-metering section 314. The fuel flow control circuitry 212 can perform a comparison between the determined flow rate and a target flow rate associated with the desired power output of the gas turbine 200 to determine whether to adjust the rate at which the fuel is flowing.

In the illustrated example of FIG. 3, the fuel system 300 also includes a first actuator 316 (e.g., a pump actuator) operatively coupled to the pump 304, a second actuator 318 (e.g., a shutoff valve actuator) operatively coupled to the shutoff valve 310, and a third actuator 320 (e.g., a metering valve actuator) operatively coupled to the metering valve 312. The fuel flow control circuitry 212 is communicatively coupled to the first actuator 316, the second actuator 318, and the third actuator 320. As such, the fuel flow control circuitry 212 can control the rate at which the fuel flows through the fuel pipe(s) 302 via signals to the first actuator 316, the second actuator 318, and the third actuator 320.

When the flow rate of the fuel through the flow-metering section 314 is not within a range of the target flow rate associated with the desired power output, the fuel flow control circuitry 212 can transmit a signal to the third actuator 320 that causes the third actuator 320 to at least partially open or close the metering valve 312 to increase or decrease the flow rate as needed. For example, in response to the flow rate of the fuel being a first amount greater than the range of the target flow rate, the fuel flow control circuitry 212 can transmit a first signal to the third actuator 320 that causes the third actuator 320 to move the metering valve 312 a first distance or first degrees towards a closed position. Further, in response to the flow rate of the fuel being a second amount greater than the range of the target flow rate, the fuel flow control circuitry 212 can transmit a second signal to the third actuator 320 that causes the third actuator 320 to move the metering valve 312 a second distance or second degrees towards the closed position.

In some examples, the third actuator 320 is implemented by an electric motor (e.g., a stepper motor, a linear motor, an electromagnetic actuator, etc.). In such examples, the fuel flow control circuitry 212 can modulate a current of a signal to the third actuator 320 to implement a certain positional adjustment of the metering valve 312. For example, the first signal from the fuel flow control circuitry 212 can include a first current to cause the third actuator 320 to move the metering valve 312 move a certain distance or rotational degrees (e.g., 0.1 degrees))(°. Further, the second signal from the fuel flow control circuitry 212 can include a second current to cause the third actuator 320 to move the metering valve 312 another distance or rotational degrees (e.g., about 0.5°). Accordingly, the fuel flow control circuitry 212 can track the signals sent to the third actuator 320 to determine a position of the metering valve 312 and/or determine an impending signal to the third actuator 320 to cause the metering valve 312 to move to a certain position.

In some examples, the third actuator 320 is implemented by a hydraulic actuator paired with an electrohydraulic servo valve (EHSV). Accordingly, the fuel flow control circuitry 212 can transmit the first and/or second signals to the third actuator 320, which converts the signal(s) to movement of a hydraulic fluid that adjusts a position of the metering valve 312. In such examples, the fuel flow control circuitry 212 can determine the position of the metering valve 312 based on a position of the hydraulic actuator associated with the third actuator 320. In some examples, to adjust the flow rate of the fuel in the fuel pipe(s) 302, the fuel flow control circuitry 212 transmits a signal to the first actuator 316 that causes the first actuator 316 to adjust a rate at which the pump 304 rotates, therefore changing the pressure and the rate of the fuel flow through the fuel pipe(s) 302. In some examples, to adjust the flow rate of the fuel in the fuel pipe(s) 302, the fuel flow control circuitry 212 transmits a signal to the third actuator 320 that causes the third actuator 320 to adjust a position of the metering valve 312 and, thus, modify a rate at which the fuel flows past the metering valve 312 towards the combustor 202. Additionally or alternatively, the fuel flow control circuitry 212 can cause the second actuator 318 to open or close the shutoff valve 310 in response to the gas turbine 200 starting or ending power operations.

Additionally or alternatively, the first actuator 316, the second actuator 318, and/or the third actuator 320 can be implemented by a linear actuator, a rotary actuator, a hydraulic actuator, a pneumatic actuator, an electric actuator, and/or any other type of actuator. In some examples, the second actuator 318 and/or the third actuator 320 utilizes a solenoid instead of an EHSV to position the shutoff valve 310 and/or the metering valve 312. In some examples, the second actuator 318 and/or third actuator 320 utilizes compressible fluid (e.g. air, hydrogen, etc.) or incompressible fluid (e.g. jet fuel, oil, hydraulic fluid, etc.) as the working fluid to position the shutoff valve 310 and/or metering valve 312.

Figure 4:
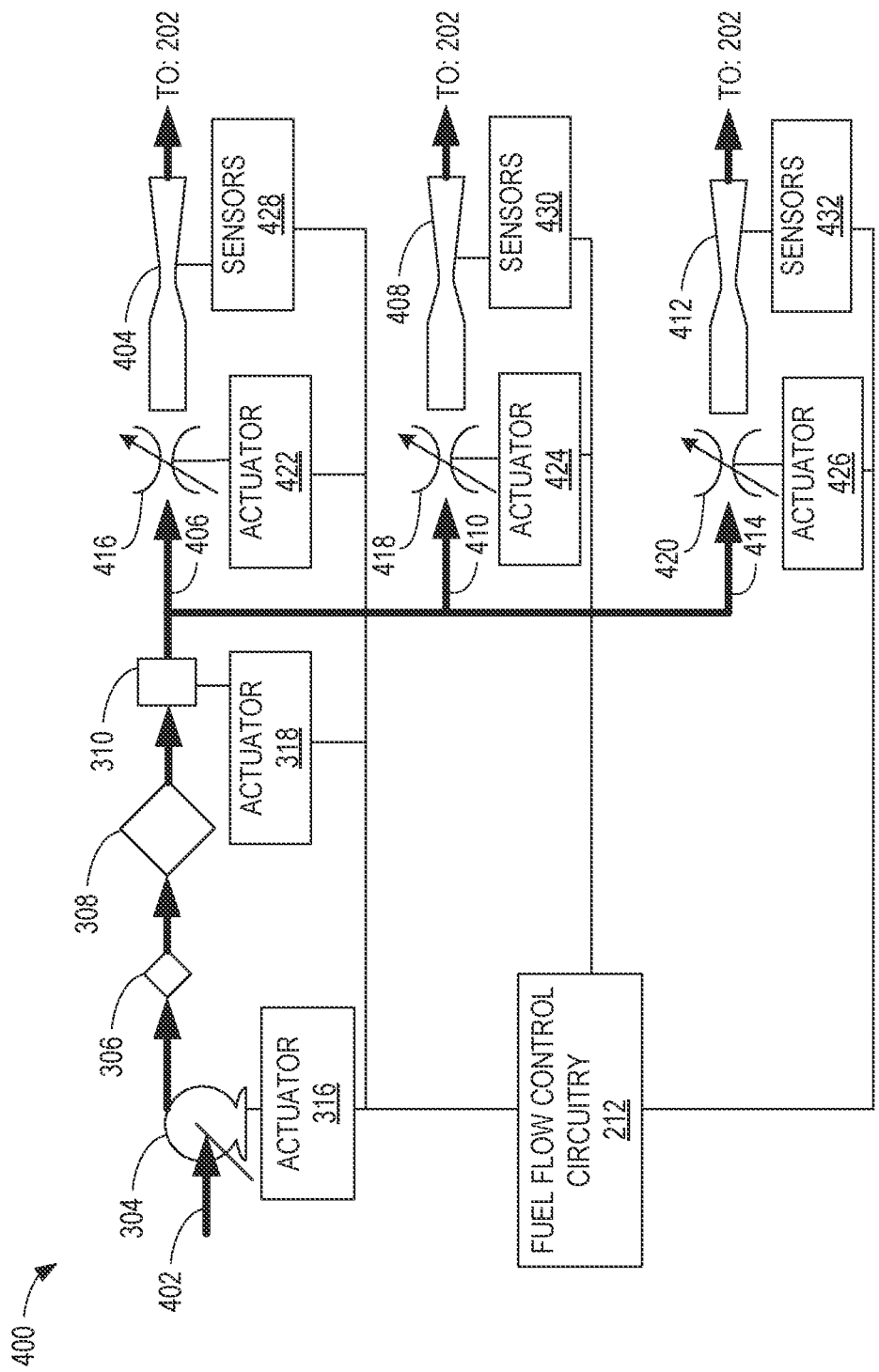
FIG. 4 is a second example schematic representation of a fuel system associated the example gas turbine of FIG. 2.

FIG. 4 is a second example schematic representation of a fuel system 400 associated with the fuel circuit 210 of the example gas turbine 200 of FIG. 2. In the illustrated example of FIG. 4, the fuel system 400 includes the fuel flow control circuitry 212, the pump 304, the filter 306, the heat exchanger 308, the shutoff valve 310, the first actuator 316, and the second actuator 318 of FIG. 3 operatively coupled to another example pipe(s) 402.

The example pipe(s) 402 of FIG. 4 define(s) flow paths through which the fuel flows to different zones of the combustor 202 in parallel. To enable the flow rate of the fuel to the different zones of the combustor 202 to be monitored, the fuel system 400 includes a first flow-metering section 404 (e.g., a first one of the flow-metering section 314 of FIG. 3) defined in a first portion 406 of the pipe(s) 402, a second flow-metering section 408 (e.g., a second one of the flow-metering section 314 of FIG. 3) defined in a second portion 410 of the pipe(s) 402, and a third flow-metering section 412 (e.g., a third one of the flow-metering section 314 of FIG. 3) defined in a third portion 414 of the pipe(s) 402. Furthermore, the fuel system 400 includes a first metering valve 416 (e.g., a first one of the metering valve 312 of FIG. 3) operatively coupled to the first portion 406 of the pipe(s) 402 upstream of the first flow-metering section 404, a second metering valve 418 (e.g., a second one of the metering valve 312 of FIG. 3) operatively coupled to the second portion 410 of the pipe(s) 402 upstream of the second flow-metering section 408, and a third flow-metering valve 420 (e.g., a third one of the metering valve 312 of FIG. 3) operatively coupled to the third portion 414 of the pipe(s) 402 upstream of the third flow-metering section 412. Additionally, the fuel system 400 includes a first metering valve actuator 422 (e.g., a first one of the third actuator 320 of FIG. 3) operatively coupled to the first metering valve 416, a second metering valve actuator 424 (e.g., a second one of the third actuator 320 of FIG. 3) operatively coupled to the second metering valve 418, and a third metering valve actuator 426 (e.g., a third one of the third actuator 320 of FIG. 3) operatively coupled to the third metering valve 420. Furthermore, the fuel system 400 includes first sensors 428 (e.g., a first one of the sensors 322 of FIG. 3) operatively coupled to the first flow-metering section 404, second sensors 430 (e.g., a second one of the sensors 322 of FIG. 3) operatively coupled to the second flow-metering section 408, and third sensors 432 (e.g., a third one of the sensors 322 of FIG. 3) operatively coupled to the third flow-metering section 412.

In the illustrated example of FIG. 4, the first sensors 428, the second sensors 430, and the third sensors 432 include temperature sensors that measure a temperature of the fuel in the respective flow-metering sections 404, 408, 412. Further, the sensors 428, 430, 432 include pressure sensors that measure pressures of the fuel as the fuel flows through different cross-sectional areas defined by the respective flow-metering sections 404, 408, 412. Additionally, the sensors 428, 430, 432 can include a throttle lever position sensor and/or any other sensor to monitor conditions associated with the gas turbine 200. In some examples, the fuel flow control circuitry 212 determines a desired power output based on signals from the throttle lever position sensor. In some examples, the fuel flow control circuitry 212 determines the desired power output based on a control signal separate from the sensors 428, 430, 432.

In the illustrated example of FIG. 4, the first portion 406 of the pipe(s) 402 is in fluid connection with (e.g., fluidly coupled to) a first zone of the combustor 202 of FIG. 2, the second portion 410 of the pipe(s) 402 is in fluid connection with a second zone of the combustor 202 of FIG. 2, and the third portion 414 of the pipe(s) 402 is in fluid connection with a third zone of the combustor 202. Although the pipe(s) 402 of the illustrated example of FIG. 4 include three portions to feed three different zones of the combustor 202, it should be understood that the fuel system 400 can include a pipe(s) having a different quantity of portions to feed any number of different zones of the combustor 202 as well as flow-metering sections defined in the different portions and metering valves operatively coupled to the different portions.

In the illustrated example of FIG. 4, the fuel flow control circuitry 212 determines target flow rates through the respective portions 406, 410, 414 of the pipe(s) 402 based on the desired power output. Furthermore, the fuel flow control circuitry 212 can compute respective flow rates of the fuel through the respective portions 406, 410, 414 of the pipe(s) 402 based on measurements from the sensors 428, 430, 432 and cross-sectional areas in the respective flow-metering sections 404, 408, 412, as discussed in further detail below. In the illustrated example, the fuel flow control circuitry 212 performs comparisons between the target flow rates through the respective portions 406, 410, 414 of the pipe(s) 402 and the computed flow rates through the respective portions 406, 410, 414 of the pipe(s) 402. As a result, the fuel flow control circuitry 212 can determine whether a positional adjustment to one or more of the metering valves 416, 418, 420 is needed based on the comparisons. For example, in response to determining that the flow rate of the fuel through the first portion 406 of the pipe(s) 402 is less than a target flow rate associated with the first zone of the combustor 202 given the desired power output, the fuel flow control circuitry 212 can cause the first actuator 422 to move the first metering valve 416 towards an open position (e.g., a fully open position) to increase the flow rate of the fuel through the first portion 406 of the pipe(s) 402 and, thus, help obtain a power output in the gas turbine 200 that corresponds to the desired power output.

Figure 5A:
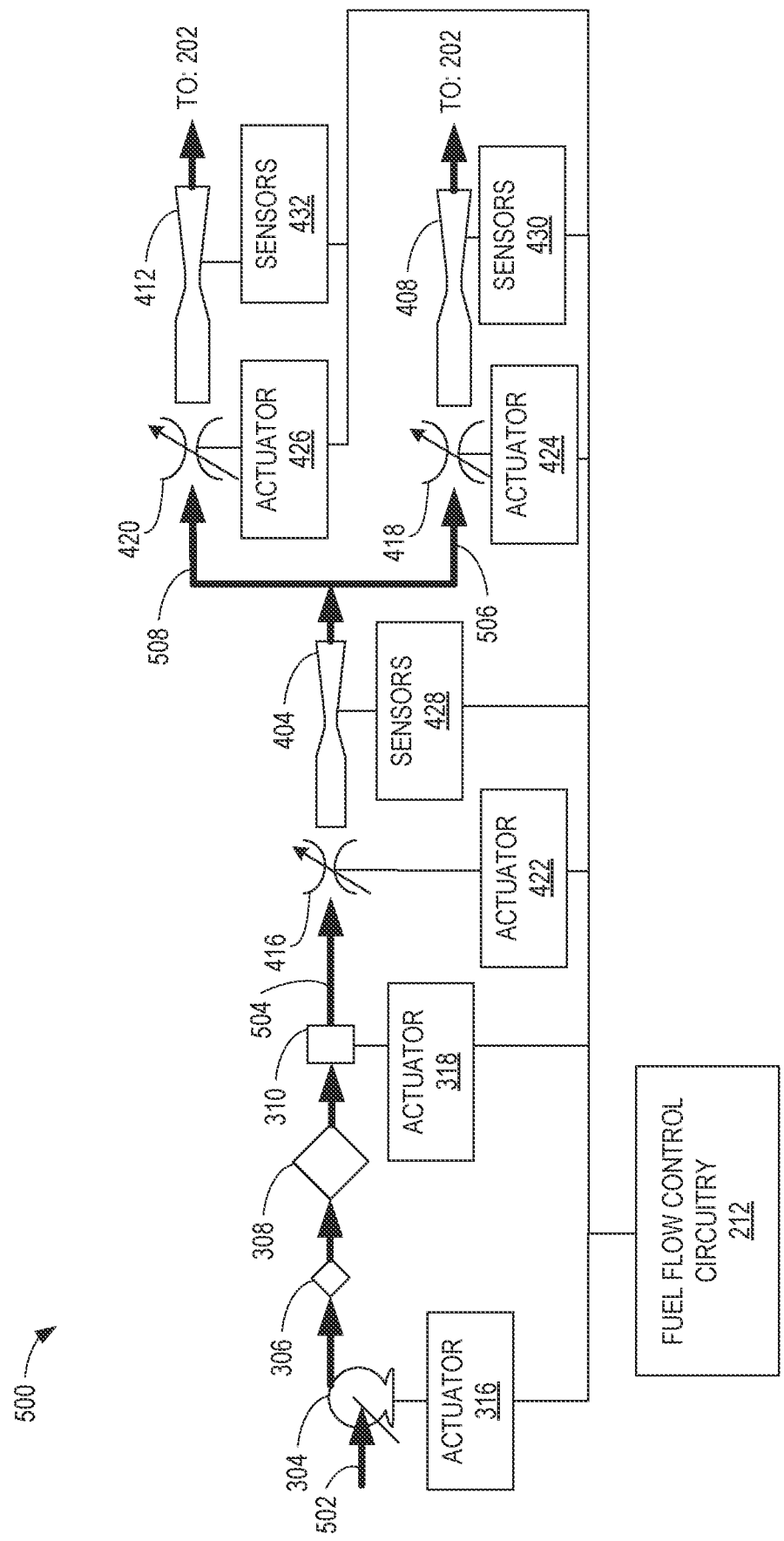
FIG. 5A is a third example schematic representation of a fuel system associated the example gas turbine of FIG. 2.

FIG. 5A is a third example schematic representation of a fuel system 500 associated with the fuel circuit 210 of the example gas turbine 200 of FIG. 2. In the illustrated example of FIG. 5A, the fuel system 500 includes the fuel flow control circuitry 212, the pump 304, the filter 306, the heat exchanger 308, the shutoff valve 310, the first actuator 316, and the second actuator 318, the first metering valve 416, the second metering valve 418, and the third metering valve 420 operatively coupled to another example pipe(s) 502.

In the illustrated example of FIG. 5A, the pipe(s) 502 include a main trunk 504 in fluid connection with (e.g., fluidly coupled to) a first branch 506 and a second branch 508. Specifically, the pipe(s) 502 include sections, such as the first branch 506 and the second branch 508, that branch off of the main trunk 504 to feed different areas of the combustor 202 of FIG. 2. Accordingly, an entirety of a fuel flow in the fuel system 500 passes through the main trunk 504 in advance of flowing through the first branch 506 or the second branch 508. Further, the first branch 506 can feed fuel to a first area of the combustor 202 and the second branch 508 can feed the fuel to a second area of the combustor 202. Although the fuel system 500 of the illustrated example includes the first branch 506 and the second branch 508, it should be understood that the main trunk 504 can supply any quantity of branches.

In the illustrated example of FIG. 5A, the first flow-metering section 404 is defined in the main trunk 504 of the pipe(s) 502 downstream of the first metering valve 416. As such, all of the fuel flowing towards the combustor 202 passes through the first flow-metering section 404. Further, the second flow-metering section 408 is defined in the first branch 506 of the pipe(s) 502 downstream of the second metering valve 418, and the third flow-metering section 412 is defined in the second branch 508 of the pipe(s) 502 downstream of the third metering valve 420. As such, a portion of the fuel flowing towards a first zone of the combustor 202 passes through the second flow-metering section 408, and a portion of the fuel flowing towards a second zone of the combustor 202 passes through the third flow-metering section 412.

In the illustrated example of FIG. 5A, the fuel flow control circuitry 212 can calculate a first flow rate of the fuel through the first flow-metering section 404 based on a temperature and pressures measured by the sensors 428 and respective cross-sectional areas in the first flow-metering section 404 at which the pressures are measured. Furthermore, the fuel flow control circuitry 212 can identify a total target flow rate associated with a desired power output for the gas turbine 200 of FIG. 2. The fuel flow control circuitry 212 performs a first comparison between the total target flow rate and the calculated first flow rate to determine whether to cause the first actuator 316, the second actuator 318, and/or the first metering valve actuator 422 to adjust a rate at which the fuel is flowing through the main trunk 504.

Additionally, the fuel flow control circuitry 212 can calculate a second flow rate of the fuel through the second flow-metering section 408 and/or a third flow rate of the fuel through the third flow-metering section 412 based on measurements by the sensors 430, 432 and parameters associated with the respective flow-metering sections 408, 412. Furthermore, the fuel flow control circuitry 212 can identify a first partial target flow rate associated with the first zone of the combustor 202 in connection with the first branch 506 of the pipe(s) 502 based on the desired power output. Similarly, the fuel flow control circuitry 212 can identify a second partial target flow rate associated with the second zone of the combustor 202 in connection with the second branch 508 of the pipe(s) 502 based on the desired power output. In the illustrated example of FIG. 5A, the fuel flow control circuitry 212 performs a second comparison between the first partial target flow rate and the calculated second flow rate to determine whether to cause the second metering valve actuator 424 to adjust a rate at which the fuel is flowing through the first branch 506 of the pipe(s) 502 and into the first zone of the combustor 202. In the illustrated example of FIG. 5A, the fuel flow control circuitry 212 performs a third comparison between the second partial target flow rate and the calculated third flow rate to determine whether to cause the third metering valve actuator 426 to adjust a rate at which the fuel is flowing through the second branch 508 of the pipe(s) 502 and into the second zone of the combustor 202.

Figure 5B:
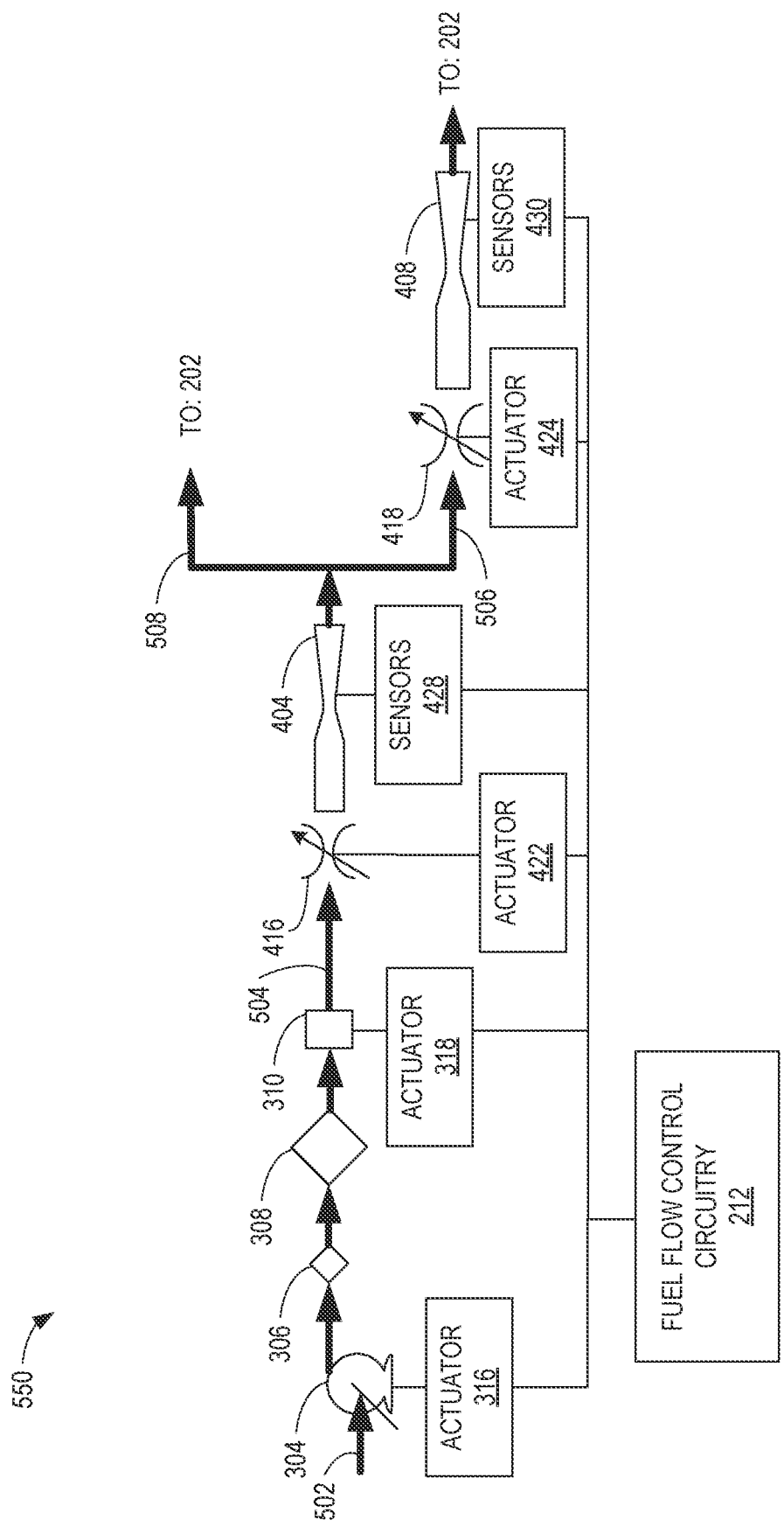
FIG. 5B is a fourth example schematic representation of a fuel system associated the example gas turbine of FIG. 2.

FIG. 5B is a fourth example schematic representation of a fuel system 550 associated with the fuel circuit 210 of the example gas turbine 200 of FIG. 2. In the illustrated example of FIG. 5B, the fuel system 550 includes the fuel flow control circuitry 212, the pump 304, the filter 306, the heat exchanger 308, the shutoff valve 310, the first actuator 316, and the second actuator 318, the first metering valve 416, and the second metering valve 418 operatively coupled to the example pipe(s) 502.

In the illustrated example of FIG. 5B, the second branch 508 of the pipe(s) 502 includes a uniform cross-sectional area. Similar to the illustrated example of FIG. 5A, the fuel flow control circuitry 212 can calculate a first flow rate of the fuel through the first flow-metering section 404 and a second flow rate of the fuel through the second flow-metering section 408. In FIG. 5B, the fuel flow control circuitry 212 determines a third flow rate of the fuel through the second branch 508 of the pipe(s) 502 based on a difference between the first flow rate and the second flow rate. As such, the fuel flow control circuitry 212 can compared the computed flow rates to target flow rates to determine whether to cause one or more of the actuator(s) 316, 318, 422, 424 to adjust the flow rate in the main trunk 504, the first branch 506, and/or the second branch 508.

Figure 6:
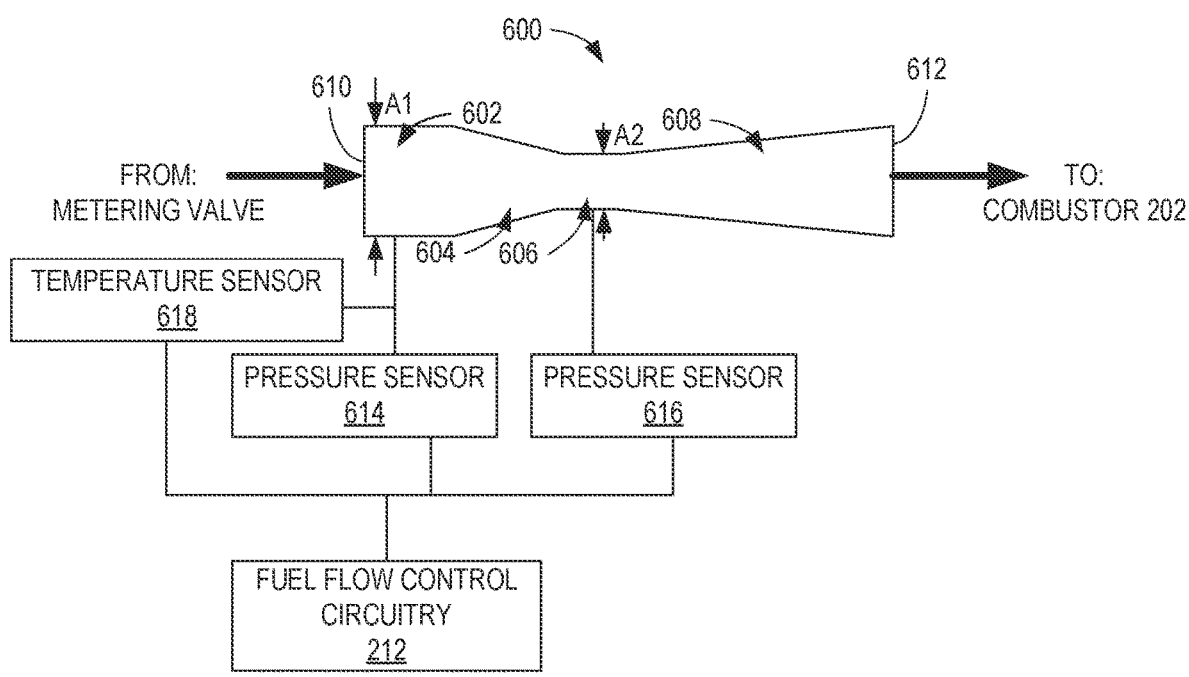
FIG. 6 illustrates a first example flow-metering section of the fuel systems of FIGS. 3-5.

FIG. 6 illustrates a first example flow-metering section 600 (e.g., the flow-metering section 314 of FIG. 3, the flow-metering sections 404, 408, 412 of FIGS. 4, 5A, and/or 5B, etc.) associated with the fuel systems 300, 400, 500, 550 of FIGS. 3, 4, 5A, and 5B. In the illustrated example of FIG. 6, a pipe body defines the flow-metering section 600. As such, an entirety of the fuel flowing through the pipe body passes through the flow-metering section 600. In FIG. 6, the flow-metering section 600 receives the fuel in response to the fuel passing through a metering valve (e.g., the metering valve 312 of FIG. 3, the metering valves 416, 418, 420 of FIGS. 4, 5A, and/or 5B, etc.). As such, the flow-metering section 600 enables a flow rate of the fuel passing the metering valve to be determined by the fuel flow control circuitry 212.

In the illustrated example of FIG. 6, the flow-metering section 600 includes a first uniform portion 602, a converging portion 604 downstream of the first uniform portion 602, a second uniform portion 606 (e.g., a throat portion) downstream of the converging portion 604, and a diverging portion 608 downstream of the second uniform portion 606. The flow-metering section 600 includes an inlet 610 defined at an end of the first uniform portion 602 opposite the converging portion 604. Further, the flow-metering section 600 includes an outlet 612 defined at an end of the diverging portion 608 opposite the second uniform portion 606. The first uniform portion 602 has a first cross-sectional area A1, and the second uniform portion 606 has a second cross-sectional area A2 smaller than the first cross-sectional area A1. In the illustrated example of FIG. 6, the first cross-sectional area A1 and the second cross-sectional area A2 are tightly controlled (e.g., manufactured with a tight tolerance range) to help enable accurate flow rate calculations.

In the illustrated example of FIG. 6, the fuel flow control circuitry 212 is communicatively coupled to a first pressure sensor 614, a second pressure sensor 616, and a temperature sensor 618. The first pressure sensor 614 measures a first pressure P1 of the fuel as the fuel flows through the first uniform portion 602 of the flow-metering section 600. The second pressure sensor 616 measures a second pressure P2 of the fuel as the fuel flows through the second uniform portion 606. The temperature sensor 618 measures a temperature of the fuel in the flow-metering section 600. The fuel flow control circuitry 212 can calculate a mass flow rate, m, of the fuel flowing through the flow-metering section 600 using Equation (1), for example:

$$\dot{m} = C\frac{P1}{RT}A1\sqrt{\frac{2RT(P1-P2)}{P1\left[\left(\frac{A1}{A2}\right)^2 - 1\right]}},\quad \text{Equation (1).}$$

In Equation (1), R is the gas constant of the fuel and C is a constant associated with a particular hardware. In some examples, the fuel flow control circuitry 212 calculates the flow rate through the flow-metering section 600 using another equation where the mass or volumetric flow rate of the fuel can be determined based on the pressure P1 in the first uniform portion 602 and the pressure P2 in the second uniform portion 606.

In the illustrated example of FIG. 6, the fuel flow control circuitry 212 can utilize the calculated mass flow rate to determine adjustments to a position or configuration the metering valve upstream of the flow-metering section 600. For example, the fuel flow control circuitry 212 can determine a target flow rate to the combustor 202, and/or or a particular area of the combustor 202, based on a desired power output for the gas turbine 200. In turn, the fuel flow control circuitry 212 can perform a comparison between the calculated mass flow rate and the target flow rate. In response to the calculated mass flow rate being greater than the target flow rate by more than a threshold tolerance limit, the fuel flow control circuitry 212 can transmit a signal to an actuator, which causes the metering valve to move towards a closed position. As a result, the metering valve blocks an increased portion of a cross-sectional area of the pipe upstream of the flow-metering section 600 to reduce the flow rate of the fuel. Similarly, in response to the calculated mass flow rate being less than the target flow rate by more than the threshold tolerance limit, the fuel flow control circuitry 212 can transmit another signal to the actuator, which causes the metering valve to move towards an open position (e.g., a fully open position). As a result, the metering valve blocks a reduced portion of the cross-sectional area of the pipe upstream of the flow-metering section 600 to increase the flow rate of the fuel. In some examples, the fuel flow control circuitry 212 determines the signal and/or the positional adjustment to the metering valve based on a difference between the calculated mass flow rate and the target flow rate.

Figure 7:
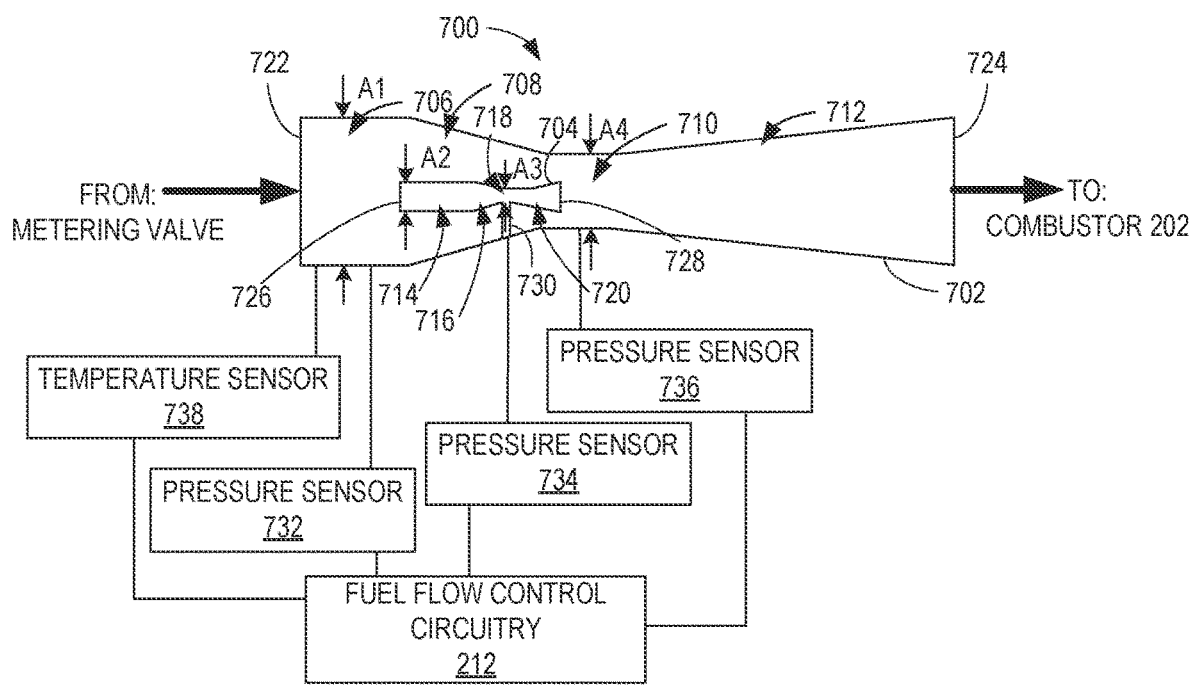
FIG. 7 illustrates a second example flow-metering section of the fuel systems of FIGS. 3-5.

FIG. 7 illustrates a second example flow-metering section 700 (e.g., the flow-metering section 314 of FIG. 3, the flow-metering sections 404, 408, 412 of FIGS. 4, 5A, and/or 5B, etc.) associated with the fuel systems 300, 400, 500, 550 of FIGS. 3, 4, 5A, and 5B. In the illustrated example of FIG. 7, the flow-metering section 700 includes an outer flow-metering section 702 and an inner flow-metering section 704 (e.g., a nested flow-metering section) positioned in, and extending through a portion of, the outer flow-metering section 702. The outer flow-metering section 702 can receive fuel in response to the fuel flowing past a metering valve (e.g., the metering valve 312 of FIG. 3, the metering valves 416, 418, 420 of FIGS. 4, 5A, and/or 5B, etc.). In turn, the flow-metering section 700 enables a flow rate of the fuel passing the metering valve to be determined by the fuel flow control circuitry 212.

The outer flow-metering section 702 can be substantially similar to the flow-metering section 600 of FIG. 6. Accordingly, the outer flow-metering section 702 includes a first uniform portion 706, a first converging portion 708 downstream of the first uniform portion 706, a second uniform portion 710 (e.g., a first throat portion) downstream of the first converging portion 708, and a first diverging portion 712 downstream of the second uniform portion 710. Similarly, the inner flow-metering section 704 includes a third uniform portion 714, a second converging portion 716 downstream of the third uniform portion 714, a fourth uniform portion 718 (e.g., a second throat portion) downstream of the second converging portion 716, and a second diverging portion 720 downstream of the fourth uniform portion 718. In the illustrated example of FIG. 7, the first uniform portion 706 has a first cross-sectional area A1, the third uniform portion 714 has a second cross-sectional area A2 smaller than the first cross-sectional area A1, the fourth uniform portion 718 has a third cross-sectional area A3 smaller than the second cross-sectional area A2, and the second uniform portion 710 has a fourth cross-sectional area A4 smaller than the first cross-sectional area A1 but larger than the second cross-sectional area A2.

In the illustrated example of FIG. 7, the outer flow-metering section 702 includes a first inlet 722 defined at an end of the first uniform portion 706 opposite the converging portion 708. Further, the outer flow-metering section 702 includes a first outlet 724 defined at an end of the first diverging portion 712 opposite the second uniform portion 710. The outer flow-metering section 702 receives the fuel through the first inlet 722 in response to the fuel flowing through a metering valve. The outer flow-metering section 702 discharges the fuel through the first outlet 724 towards the combustor 202. In the illustrated example of FIG. 7, a portion of the fuel flowing through the outer flow-metering section 702 passes through the inner flow-metering section 704. In particular, the inner flow-metering section 704 includes a second inlet 726 defined at an end of the third uniform portion 714 opposite the second converging portion 716. Further, the inner flow-metering section 704 includes a second outlet 728 defined at an end of the second diverging portion 720 opposite the fourth uniform portion 718. In the illustrated example of FIG. 7, the second inlet 726 is positioned in the first uniform portion 706 and, thus, occupies a portion of the first cross-sectional area A1. Additionally, the second outlet 728 is positioned in the second uniform portion 710 and occupies a portion of the fourth cross-sectional area A4. Advantageously, positioning the second outlet 728 in the second uniform portion 710 reduces a static pressure encountered by the inner flow-metering section 704, which amplifies pressure measurements associated with the inner flow-metering section 704 and improves an accuracy of such pressure measurements.

In the illustrated example of FIG. 7, the inner flow-metering section 704 is mounted in the outer flow-metering section 702 via a duct 730 that couples the fourth uniform portion 718 of the inner flow-metering section 704 to the first converging portion 708 of the outer flow-metering section 702. The duct 730 enables a pressure in the fourth uniform portion 718 of the inner flow-metering section 704 to be measured. In some examples, the duct 730 is defined in a pylon or stub that couples the inner flow-metering section 704 to the outer flow-metering section 702. In such examples, the pylon or stub includes a geometry that minimizes or otherwise reduces an interference with the flow of the fuel through the outer flow-metering section 702. For example, the pylon or stub can be tapered and/or curved to minimize or otherwise reduce turbulence in the outer flow-metering section 702.

In the illustrated example of FIG. 7, the fuel flow control circuitry 212 is communicatively coupled to a first pressure sensor 732 that measures a first pressure, P1, of the fuel as the fuel flows through the first uniform portion 706, a second pressure sensor 734 that measures a second pressure, P2, of the fuel as the fuel flows through the fourth uniform portion 718, a third pressure sensor 736 that measures a third pressure, P3, of the fuel as the fuel flows through the second uniform portion 710, and a temperature sensor 738 that measures a temperature, T, of the fuel in the flow-metering section 700.

In the illustrated example of FIG. 7, the fuel flow control circuitry 212 utilizes pressure measurements from the first pressure sensor 732 and the second pressure sensor 734 to calculate the flow rate of the fuel through the flow-metering section 700 until the flow rate through the inner flow-metering section 704 is choked. When the flow rate through the inner flow-metering section 704 is choked, the fuel flow control circuitry utilizes pressure measurements from the first pressure sensor 732 and the third pressure sensor 736 to calculate the flow rate of the fuel through the flow-metering section 700. Specifically, the fuel flow control circuitry 212 calculates a mass flow rate, m, of the fuel through the flow-metering section 700 using Equation (2) when the flow rate is less than a threshold flow rate (e.g., a flow rate at which the flow through the inner flow-metering section 704 is choked):

$$\dot{m} = C\frac{P1}{RT}A1\sqrt{\frac{2RT(P1-P2)}{P1\left[\left(\frac{A2}{A3}\right)^2 - 1\right]}},\quad\text{Equation (2).}$$

Advantageously, the smaller cross-sectional areas A2, A3 of the inner flow-metering section 704 enable the fuel flow control circuitry 212 to obtain accurate flow rate calculations at relatively low flow rates (e.g., flow rates where the flow through the inner flow-metering section 704 is less than the speed of sound). Moreover, the pressure in the outer flow-metering section 702 can amplify a pressure difference across the inner flow-metering section 704 to amplify a signal from the second pressure sensor 734 and, thus, enable the fuel flow control circuitry 212 to obtain accurate flow rate calculations. Additionally, because the flow rate through the inner flow-metering section 704 cannot exceed the choked flow rate, the fuel flow control circuitry 212 can switch to a utilization of pressure measurements from the outer flow-metering section 702 to calculate the flow rate of the fuel. Specifically, in response to Equation (2) yielding a mass flow rate at or near the flow rate corresponding to choked flow through the inner flow-metering section 704, the fuel flow control circuitry 212 switches from Equation (2) to Equation (3) for mass flow rate calculations:

$$\dot{m} = C\frac{P1}{RT}A1\sqrt{\frac{2RT(P1-P3)}{P1\left[\left(\frac{A1}{A4}\right)^2 - 1\right]}},\quad\text{Equation (3).}$$

In some examples, the fuel flow control circuitry 212 switches from utilization of Equation (2) to Equation (3) for flow rate calculations in response to a ratio of P1 to P2 satisfying (e.g., being greater than or equal to) a threshold ratio. In such examples, the threshold ratio is dependent on fluid properties associated with the fuel. Thus, the flow-metering section 700 enables the fuel flow control circuitry 212 to obtain accurate flow rate calculations across a wide range of flow rates. Furthermore, the cross-sectional areas A1, A2, A3, A4 in the outer and inner flow-metering sections 702, 704 are set based on a flow rate range in which precise measurements are needed. In some examples, a flow-metering section can include more than one inner flow-metering section, and the fuel flow control circuitry 212 can switch between pressure measurements in the various flow-metering sections for flow rate calculations based on ratios of the measured pressures.

Figure 8:
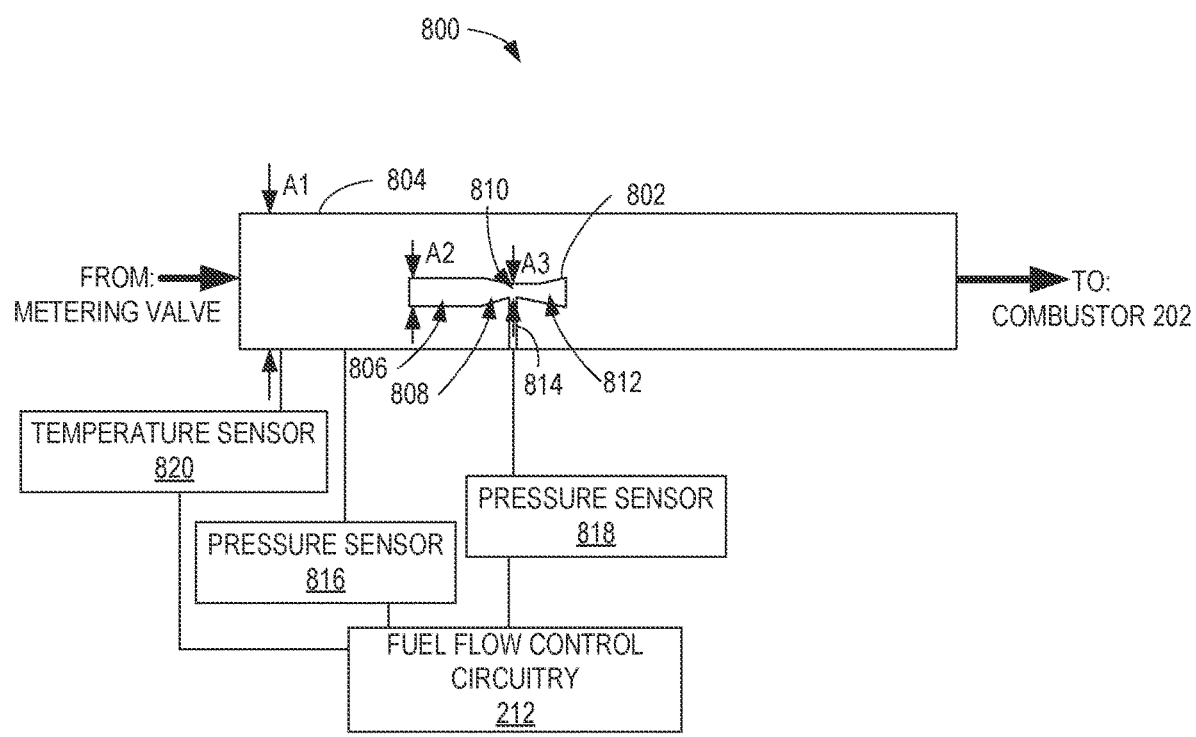
FIG. 8 illustrates a third example flow-metering section of the fuel systems of FIGS. 3-5.

FIG. 8 illustrates a third example flow-metering section 800 (e.g., the flow-metering section 314 of FIG. 3, the flow-metering sections 404, 408, 412 of FIGS. 4, 5A, and/or 5B, etc.) associated with the fuel systems 300, 400, 500, 550 of FIGS. 3, 4, 5A, and 5B. In the illustrated example of FIG. 8, the flow-metering section 800 includes an inner flow-metering section 802 positioned in, and extending through a portion of, a pipe 804 (e.g., the fuel pipe(s) 302 of FIG. 3, the pipe(s) 402 of FIG. 4, the pipe(s) 502 of FIGS. 5A and 5B, etc.). In FIG. 8, the pipe 804 has a uniform cross-sectional area A1. The pipe 804 receives fuel in response to the fuel passing through a metering valve (e.g., the metering valve 312 of FIG. 3, the metering valves 416, 418, 420 of FIGS. 4, 5A, and/or 5B, etc.). In turn, a portion of the fuel received by the pipe 804 flows through the inner flow-metering section 802.

In the illustrated example of FIG. 8, the inner flow-metering section 802 includes a first uniform portion 806, a converging portion 808 downstream of the first uniform portion 806, a second uniform portion 810 (e.g., a throat portion) downstream of the converging portion 808, and a diverging portion 812 downstream of the second uniform portion 810. The first uniform portion 806 has a second cross-sectional area A2 and the second uniform portion 810 has a third cross-sectional area A3 smaller than the second cross-sectional area A2. In the illustrated example of FIG. 6, the second cross-sectional area A2 and the third cross-sectional area A3 are tightly controlled (e.g., manufactured with a tight tolerance range) to help enable accurate flow rate calculations for flow rates within a certain range. Similar to the inner flow-metering section 704 of FIG. 7, the inner flow-metering section 802 is mounted in the pipe 804 via a duct 814 that couples to the second uniform portion 810 of the inner flow-metering section 802 and to the pipe 804.

In the illustrated example of FIG. 8, the fuel flow control circuitry 212 is communicatively coupled to a first pressure sensor 816 that measures a first pressure, P1, in the pipe 804 upstream of the inner flow-metering section 802. Additionally, the fuel flow control circuitry 212 is communicatively coupled to a second pressure sensor 818 that measures a second pressure, P2, in the second uniform portion 810 of the inner flow-metering section 802 through the duct 814. Further, the fuel flow control circuitry 212 is communicatively coupled to a temperature sensor 820 that measures a temperature of the fuel in the pipe 804. In the illustrated example of FIG. 8, the fuel flow control circuitry 212 can calculate a flow rate of the fuel using Equation (2). In turn, the fuel flow control circuitry 212 can perform a comparison between the calculated flow rate and a target flow rate to determine whether to cause a positional adjustment to the metering valve upstream of the flow-metering section 800.

Figure 9:
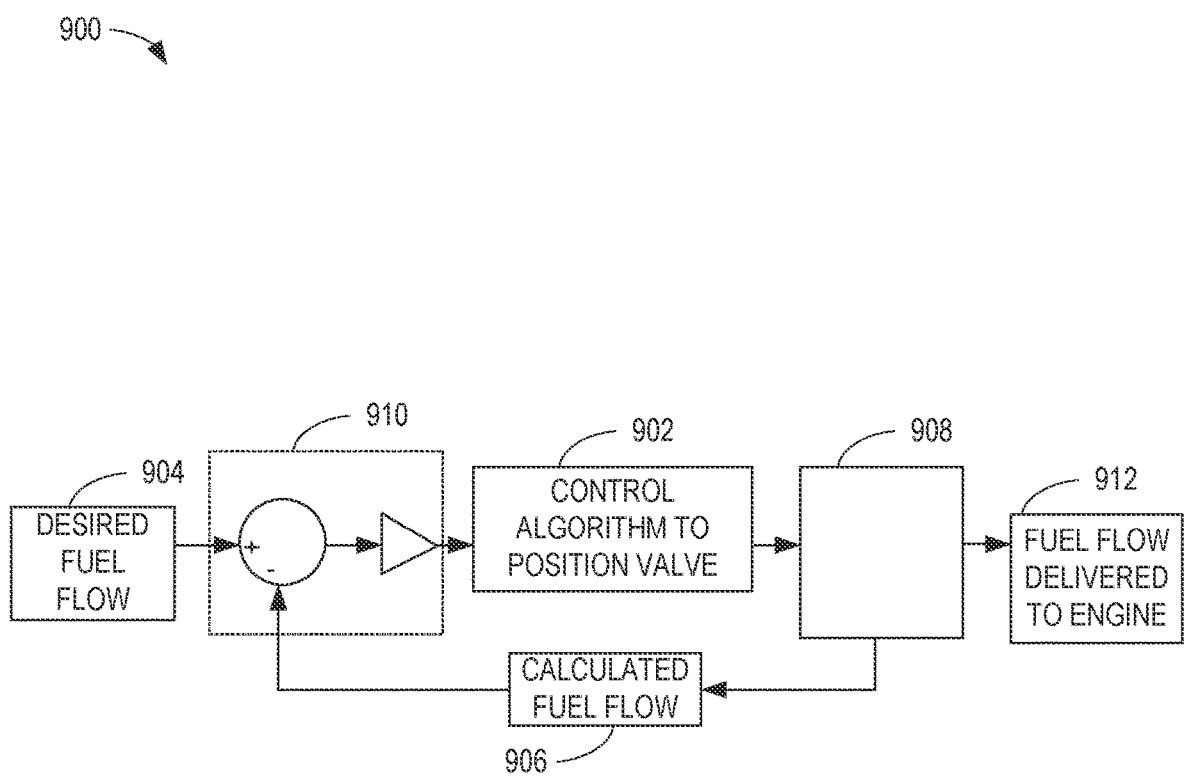
FIG. 9 illustrates an example feedback diagram that can be utilized to control a metering valve position in the fuel systems of FIGS. 3-5 based on flow rate measurements enabled by the flow-metering sections of FIGS. 6-8.

FIG. 9 illustrates an example feedback diagram 900 that the fuel flow control circuitry 212 of FIGS. 2-8 can follow or utilize to control a metering valve position 902 based on a target fuel flow rate 904 and a fuel flow rate calculation 906. The fuel flow control circuitry 212 calculates the fuel flow rate calculation 906 based on flow-metering parameters 908 (e.g., parameters measured and/or associated with the flow-metering section 314 of FIG. 3, the flow-metering sections 404, 408, 412 of FIGS. 4, 5A, and/or 5B, the flow-metering section 600 of FIG. 6, the flow-metering section 700 of FIG. 7, the flow-metering section 800 of FIG. 8, etc.). In turn, the target fuel flow rate 904 and the calculated fuel flow rate 906 can undergo mathematical computations 910 that provide the targeted metering valve position, which is set by the position control algorithm 902. Accordingly, the process can repeat and, as the metering valve position 902 causes an effective flow rate 912, the fuel flow control circuitry can recalculate the fuel flow rate calculation 906 based on updated ones of the flow-metering parameters 908 associated with any changes to the metering valve position 902.

Figure 10:
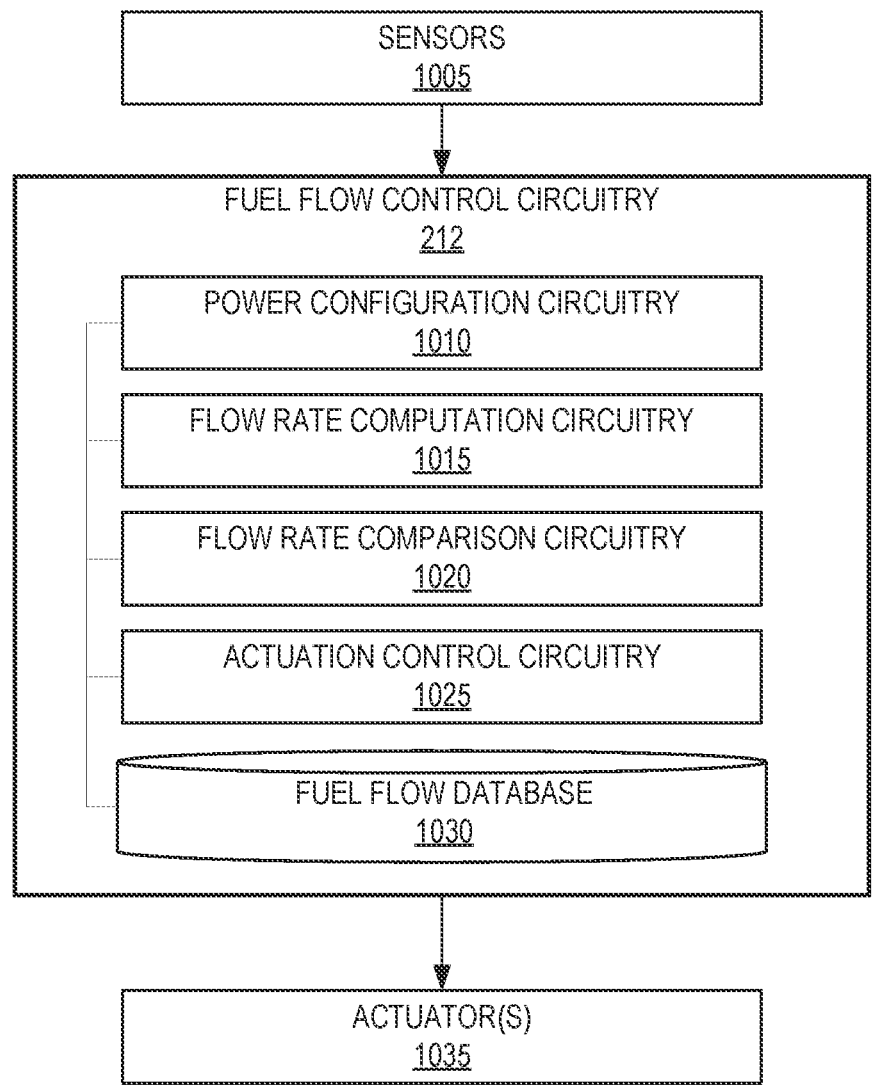
FIG. 10 is a block diagram of example fuel flow control circuitry associated with the gas turbine of FIG. 2, the fuel systems of FIGS. 3-5, and the flow-metering sections of FIGS. 6-8.

FIG. 10 is a block diagram of the fuel flow control circuitry 212 to compute and control fuel flow rates. The fuel flow control circuitry 212 may be instantiated (e.g., creating an instance of, bring into being for any length of time, materialize, implement, etc.) by processor circuitry such as a central processing unit executing instructions. Additionally or alternatively, the fuel flow control circuitry 212 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 10 may, thus, be instantiated at the same or different times. Some or all of the circuitry may be instantiated, for example, in one or more threads executing concurrently on hardware and/or in series on hardware. Moreover, in some examples, some or all of the circuitry of FIG. 10 may be implemented by microprocessor circuitry executing instructions to implement one or more virtual machines and/or containers.

In the illustrated example of FIG. 10, the fuel flow control circuitry 212 can be at least a portion of a full-authority digital engine control (FADEC) unit, an engine control unit (ECU), an electronic engine control (EEC) unit, etc., or any other type of data acquisition and/or control computing device, processor platform (e.g., processor-based computing platform), etc. The fuel flow control circuitry 212 communicates with example sensors 1005 and one or more actuator(s) 1035. The fuel flow control circuitry 212 includes example power configuration circuitry 1010, example flow rate computation circuitry 1015, example flow rate comparison circuitry 1020, example actuation control circuitry 1025, and an example fuel flow database 1030.

In the illustrated example of FIG. 10, example sensors 1005 (e.g., the sensors 322 of FIG. 3, the sensors 428, 430, 432 of FIGS. 4, 5A, and/or 5B, etc.) obtain measurements that the fuel flow control circuitry 212 utilizes to calculate and control a flow rate of fuel in a fuel system (e.g., the fuel system 300 of FIG. 3, the fuel system 400 of FIG. 4, the fuel system 500 of FIG. 5A, etc.). For example, the sensors 1005 can include pressure sensors (e.g., the pressure sensors 614, 616, 732, 734, 736, 816, 818 of FIGS. 6-8) and temperature sensors (e.g., the temperature sensors 618, 738, 820 of FIGS. 6-8) to measure pressures and a temperature of the fuel as the fuel flows through a flow-metering section (e.g., the flow-metering section 314 of FIG. 3, the flow-metering sections 404, 408, 412 of FIGS. 4, 5A, and/or 5B, the flow-metering section 600 of FIG. 6, the flow-metering section 700 of FIG. 7, the flow-metering section 800 of FIG. 8, etc.). Additionally, the sensors 1005 can measure a desired power output for the gas turbine 200 of FIG. 2. For example, the sensors 1005 can include throttle level position sensors. Accordingly, positions measured by the throttle level position sensors can correspond to the desired power output.

In the illustrated example of FIG. 10, the fuel flow control circuitry 212 includes the power configuration circuitry 1010 to determine a target fuel flow rate based on the desired power output. In some examples, the fuel flow control circuitry 212 determines the desired power output based on a control signal received by the fuel flow control circuitry 212 and/or engine operating conditions. In some examples, the power configuration circuitry 1010 performs a look-up of the desired power output in the fuel flow database 1030 to identify the corresponding target fuel flow rate. In some examples, the power configuration circuitry 1010 identifies respective target fuel flow rates for respective areas of the combustor 202 of FIG. 2. In some examples, the power configuration circuitry 1010 is instantiated by processor circuitry executing power configuration instructions and/or configured to perform operations such as those represented by the flowcharts of FIGS. 11 and/or 12.

In the illustrated example of FIG. 10, the fuel flow control circuitry 212 includes the flow rate computation circuitry 1015 to compute the flow rate through the flow-metering section(s) of the fuel system. For example, the fuel flow control circuitry 212 can utilize the cross-sectional areas associated with the flow-metering section(s), the pressures measured by the sensors 1005, and the temperature measured by the sensors 1005 to calculate the flow rate of the fuel. In some examples, the flow rate computation circuitry 1015 is instantiated by processor circuitry executing flow rate computation instructions and/or configured to perform operations such as those represented by the flowcharts of FIGS. 11 and/or 12.

In the illustrated example of FIG. 10, the fuel flow control circuitry 212 includes the flow rate comparison circuitry 1020 to compare the flow rate computed by the flow rate computation circuitry 1015 to the target flow rate identified by the power configuration circuitry 1010. As such, the flow rate comparison circuitry 1020 can determine whether an adjustment is needed to a position or orientation of the metering valve(s) upstream of the flow-metering section(s) to ensure the downstream combustor area receives the fuel at the target flow rate. In some examples, the flow rate comparison circuitry 1020 is instantiated by processor circuitry executing flow rate comparison instructions and/or configured to perform operations such as those represented by the flowcharts of FIGS. 11 and/or 12.

In the illustrated example of FIG. 10, the fuel flow control circuitry 212 includes the actuation control circuitry 1025 to cause the actuator(s) 1035 (e.g., the actuators 316, 318, 320 of FIG. 3-5, the actuators 422, 424, 426 of FIGS. 4, 5A, and/or 5B) to adjust a position of the metering valve(s) in response to the computed flow rate being outside a range identified by the target flow rate. In some examples, the actuation control circuitry 1025 causes the actuators 1035 to implement adjustments proportion to the difference between the computed flow rate and the target flow rate. That is, when the computed flow rate is separated from the target flow rate by a first amount, the actuation control circuitry 1025 can cause the actuators 1035 to adjust the position of the metering valve by a first distance or first degree of rotation. Further, when the computed flow rate is separated from the target flow rate by a second amount greater than the first amount, the actuation control circuitry 1025 can cause the actuators 1035 to adjust the position of the metering valve by a second distance greater than the first distance or second degree of rotation greater than the first degree of rotation to help the fuel flow rate quickly reach the target fuel flow rate. In some examples, the actuation control circuitry 1025 is instantiated by processor circuitry executing actuation control instructions and/or configured to perform operations such as those represented by the flowcharts of FIGS. 11 and/or 12.

In some examples, a fuel system (e.g., the fuel systems 300, 400, 500, 550 of FIGS. 3, 4, 5A, and 5B) includes means for transporting a fluid to a combustor. For example, the means for transporting can be implemented by the fuel circuit 210 of FIG. 2 and/or the fuel pipe(s) 302, 402, 502 of FIGS. 3, 4, 5A, and 5B.

In some examples, the fuel system includes means for causing a pressure difference in the means for transporting. For example, the means for causing the pressure difference can be implemented by the flow-metering sections 314, 404, 408, 412, 600, 700, 800 of FIGS. 3-8.

In some examples, the fuel system includes means for adjusting a flow rate in the means for transporting based on the pressure difference. For example, the means for adjusting the flow rate can be implemented by the fuel flow control circuitry 212, the actuators 316, 318, 320, 422, 424, 426 of FIGS. 3-5, the pump 304 of FIGS. 3-5, and/or the valves 310, 312, 416, 418, 420 of FIGS. 3, 4, 5A, and/or 5B. In some examples, the fuel flow control circuitry 212 can be instantiated by processor circuitry such as the example processor circuitry 1312 of FIG. 13. For instance, the fuel flow control circuitry 212 may be instantiated by an example microprocessor executing machine executable instructions such as those implemented by blocks 1102, 1104, 1106, 1108, 1110 1112, 1114, 1116, 1118, 1120, 1122, 1124 of FIG. 11 and/or blocks 1202, 1204, 1206, 1208, 1210, 1212, 1214, 1216, 1218, 1220, 1222, 1224, 1226, 1228, 1230, 1232, 1234, 1236, 1238, 1240, 1242. In some examples, the fuel flow control circuitry 212 can be instantiated by hardware logic circuitry, which may be implemented by an ASIC, XPU, or the FPGA circuitry structured to perform operations corresponding to the machine readable instructions. Additionally or alternatively, the fuel flow control circuitry 212 can be instantiated by any other combination of hardware, software, and/or firmware. For example, the fuel flow control circuitry 212 can be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the fuel system includes means for monitoring fluid pressure. For example, the means for monitoring fluid pressure can monitor a first fluid pressure in a first portion of the means for transporting and a second fluid pressure in a second portion of the means for transporting. In such examples, the pressure difference caused by the means for causing corresponds to the first fluid pressure and the second fluid pressure. For example, the means for monitoring the first and second fluid pressures can be implemented by the sensors 322 of FIG. 3, the sensors 428, 430, 432 of FIGS. 4, 5A, and/or 5B, the pressure sensors 614, 616 of FIG. 6, the pressure sensors 732, 734, 736 of FIG. 7, and/or the pressure sensors 816, 818 of FIG. 8.

While an example implementation of the fuel flow control circuitry 212 of FIGS. 2-8 is illustrated in FIG. 10, one or more of the elements, processes, and/or devices illustrated in FIG. 10 may be combined, divided, re-arranged, omitted, eliminated, and/or implemented in any other way. Further, the example power configuration circuitry 1010, the example flow rate computation circuitry 1015, the example flow rate comparison circuitry 1020, the example actuation control circuitry 1025, the example fuel flow database 1030, and/or, more generally, the example fuel flow control circuitry 212 of FIG. 10, may be implemented by hardware alone or by hardware in combination with software and/or firmware. Thus, for example, any of the example power configuration circuitry 1010, the example flow rate computation circuitry 1015, the example flow rate comparison circuitry 1020, the example actuation control circuitry 1025, the example fuel flow database 1030, and/or, more generally, the example fuel flow control circuitry 212, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example fuel flow control circuitry 212 of FIGS. 2-8 may include one or more elements, processes, and/or devices in addition to, or instead of, those illustrated in FIG. 10, and/or may include more than one of any or all of the illustrated elements, processes, and devices.

Figure 11:
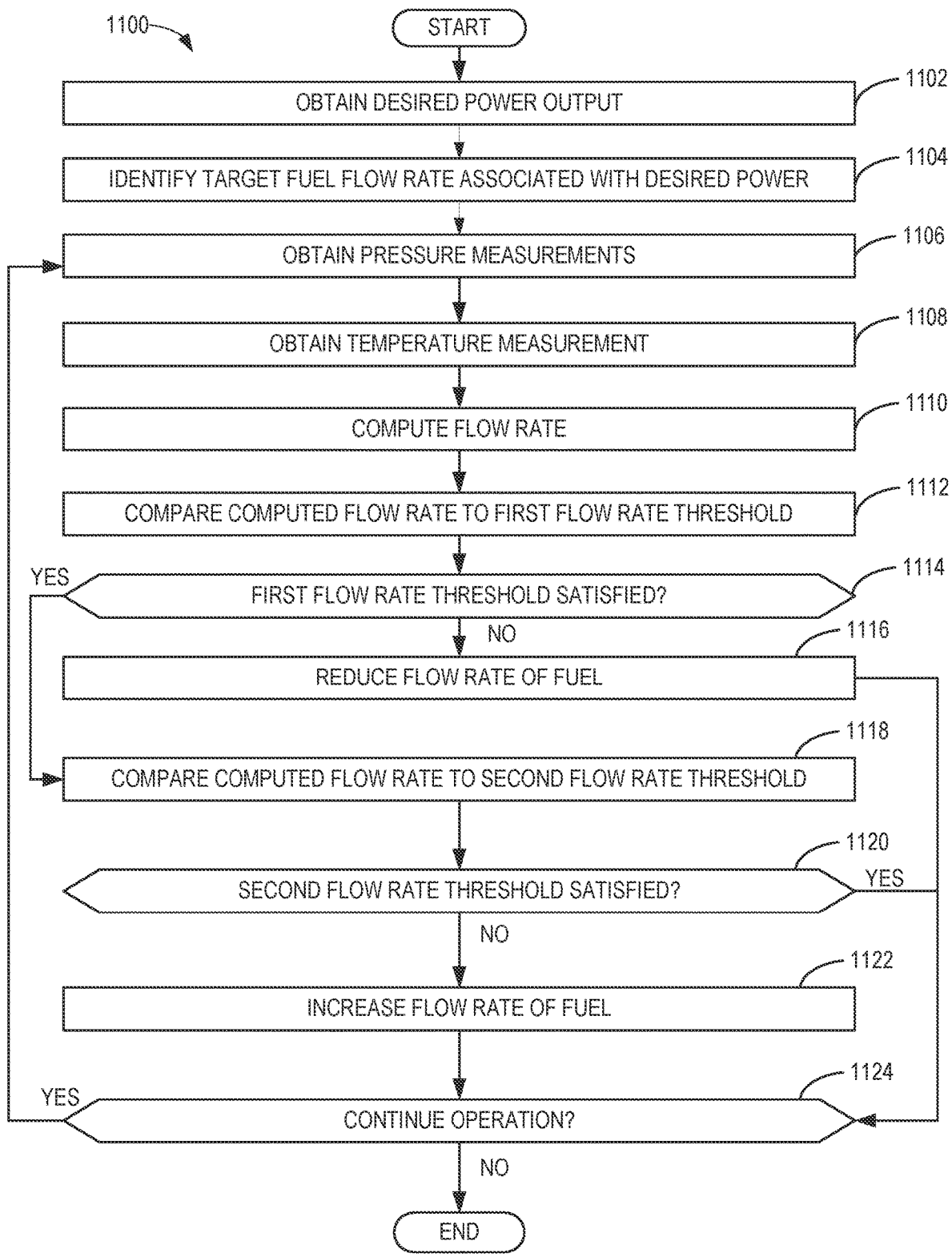
FIG. 11 is a first flowchart representative of example machine readable instructions and/or example operations that may be executed by example processor circuitry to implement the fuel flow control circuitry 212 of FIGS. 2-8 and 10.
Figure 12:
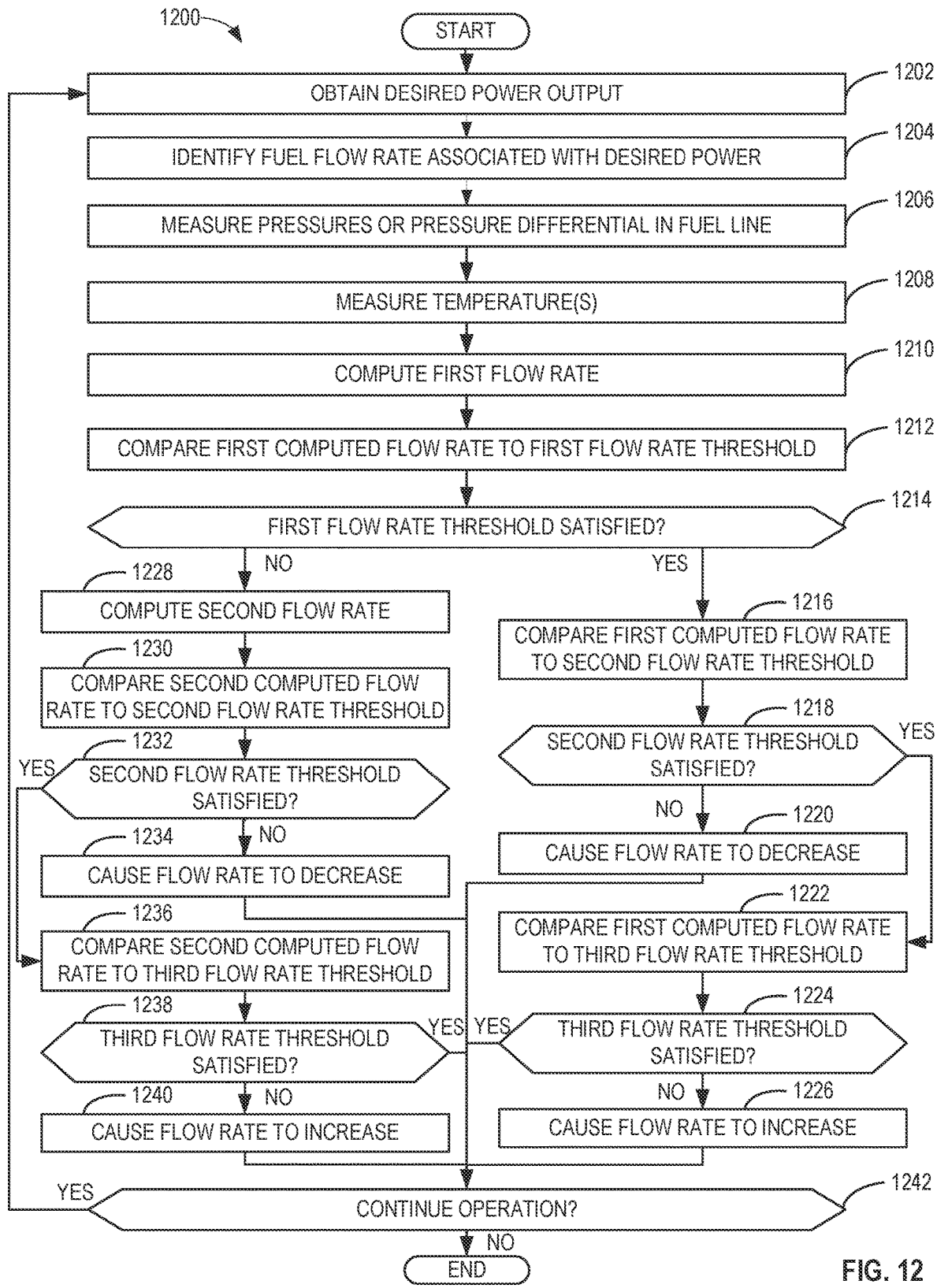
FIG. 12 is a second flowchart representative of example machine readable instructions and/or example operations that may be executed by example processor circuitry to implement the fuel flow control circuitry 212 of FIGS. 2-8 and 10.

Flowcharts representative of example machine readable instructions, which may be executed to configure processor circuitry to implement the fuel flow control circuitry 212 of FIG. 10, are shown in FIGS. 11 and 12. The machine readable instructions may be one or more executable programs or portion(s) of an executable program for execution by processor circuitry, such as the processor circuitry 1312 shown in the example processor platform 1300 discussed below in connection with FIG. 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11 and 12, many other methods of implementing the example fuel flow control circuitry 212 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 11 and 12 can be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information).

FIG. 11 is a flowchart representative of example machine readable instructions and/or example operations 1100 that can be executed and/or instantiated by processor circuitry to compute and control a flow rate of fuel in transport to a combustor of a gas turbine. The machine readable instructions and/or the operations 1100 of FIG. 11 begin at block 1102, at which the fuel flow control circuitry 212 (FIGS. 2-8 and 10) obtains a desired power output for a gas turbine (e.g., the gas turbine 200 of FIG. 2). In some examples, the power configuration circuitry 1010 (FIG. 10) determines the desired power output based on one or more signals from the sensor(s) 1005 (FIG. 10). For example, the signal(s) from the sensor(s) 1005 can correspond to a position of a throttle lever indicative of the desired power output.

At block 1104, the fuel flow control circuitry 212 identifies a target fuel flow rate associated with the desired power output. For example, the power configuration circuitry 1010 can identify the target fuel flow rate in a fuel pipe (e.g., the fuel circuit 210 of FIG. 2, the fuel pipe(s) 302, 402, 502 of FIGS. 3, 4, 5A, and 5B, etc.) associated with the desired power output in the fuel flow database 1030. In some examples, the power configuration circuitry 1010 determines the target fuel flow rate for a particular fuel pipe (e.g., the first branch 506, the second branch 508, etc.) based on an area of the combustor in fluid connection with (e.g., fluidly coupled to) the particular fuel pipe. For example, to produce the desired power output, a first area of the combustor in fluid connection with a first fuel pipe may be provided fuel at a first flow rate and a second area of the combustor in fluid connection with a second fuel pipe may be provided fuel at a second flow rate different from the first flow rate.

At block 1106, the fuel flow control circuitry 212 obtains pressure measurements from the sensor(s) 1005. For example, the sensor(s) 1005 can measure a first pressure in a first portion of the fuel pipe that has a first cross-sectional area. Further, the sensor(s) 1005 can measure a second pressure in a second portion of the fuel pipe that has a second cross-sectional area smaller than the first cross-sectional area. In some examples, the sensor(s) 1005 measure a third pressure in a third portion of the fuel pipe that has a third cross-sectional area. In some examples, the sensor(s) 1005 measure a pressure differential(s) between the first, second, and/or third portions of the fuel pipe. Further, the flow rate computation circuitry 1015 can receive the first, second, and/or third pressures or the pressure differentials from the sensor(s) 1005.

At block 1108, the fuel flow control circuitry 212 obtains a temperature measurement of the fuel in the fuel pipe. For example, the sensor(s) 1005 can measure the temperature of the fuel in the fuel pipe. Further, the flow rate computation circuitry 1015 can receive the temperature measurement from the sensor(s) 1005.

At block 1110, the fuel flow control circuitry 212 computes a flow rate of the fuel in the fuel pipe. For example, the flow rate computation circuitry 1015 (FIG. 10) can compute the flow rate based on the measured pressures and the measured temperature of the fuel. In some examples, the flow rate computation circuitry 1015 utilizes Equation (1) or Equation (2) described herein to compute the flow rate based on the measured pressures and temperature of the fuel.

At block 1112, the fuel flow control circuitry 212 compares the computed flow rate to a first flow rate threshold (e.g., an upper flow rate threshold). For example, the flow rate comparison circuitry 1020 (FIG. 10) can compare the computed flow rate to the first flow rate threshold. In some examples, the flow rate comparison circuitry 1020 determines the first flow rate threshold and a second flow rate threshold based on the target flow rate associated with the desired power output. For example, the flow rate comparison circuitry 1020 can set an upper limit and a lower limit on flow rates within an acceptable range of the target flow rate.

At block 1114, the fuel flow control circuitry 212 determines whether the flow rate of the fuel satisfies (e.g., is less than) the first flow rate threshold. For example, the flow rate comparison circuitry 1020 can determine the flow rate satisfies the first flow rate threshold in response to the computed flow rate being greater than, or equal to, a lower (i.e., minimum) tolerance limit of the target flow rate associated with the desired power output. In response to the flow rate of the fuel satisfying the first flow rate threshold, the operations 1100 skip to block 1118. Otherwise, in response to the flow rate of the fuel not satisfying the first flow rate threshold, the operations 1100 proceed to block 1116.

At block 1116, the fuel flow control circuitry 212 reduces the flow rate of the fuel in the fuel pipe. For example, the actuation control circuitry 1025 (FIG. 10) can cause the actuator(s) 1035 (FIG. 10) to reduce the flow rate of the fuel in the fuel pipe. In some examples, the actuation control circuitry 1025 causes the actuator(s) 1035 to at least partially close a fuel metering valve (e.g., the fuel metering valves to reduce the flow rate of the fuel. In some examples, the actuation control circuitry 1025 causes the actuator(s) 1035 to reduce a rate at which a fuel pump drives the fuel through the fuel pipe. In response to reducing the flow rate of the fuel in the fuel pipe, the operations 1100 skip to block 1124.

At block 1118, the fuel flow control circuitry 212 compares the flow rate of the fuel in the fuel pipe to the second flow rate threshold (e.g., a lower flow rate threshold). For example, the flow rate comparison circuitry 1020 can compare the flow rate computed based on the measured pressure(s) and temperature to the second flow rate threshold defined based on the desired power output.

At block 1120, the fuel flow control circuitry 212 determines whether the flow rate of the fuel satisfies (e.g., is greater than) the second flow rate threshold. For example, the flow rate comparison circuitry 1020 can determine the flow rate satisfies the second flow rate threshold in response to the computed flow rate being less than or equal to an upper (i.e., maximum) tolerance limit of the target flow rate associated with the desired power output. In response to the flow rate of the fuel satisfying the second flow rate threshold, the operations 1100 skip to block 1124. Otherwise, in response to the flow rate of the fuel not satisfying the second flow rate threshold, the operations 1100 proceed to block 1122.

At block 1122, the fuel flow control circuitry 212 increases a flow rate of the fuel. For example, the actuation control circuitry 1025 can cause the actuator(s) 1035 to increase the flow rate of the fuel in the fuel pipe. In some examples, the actuation control circuitry 1025 causes the actuator(s) 1035 to at least partially open the fuel metering valve to increase the flow rate of the fuel in the fuel pipe. In some examples, the actuation control circuitry 1025 causes the actuator(s) 1035 to increase a rate at which the fuel pump drives the fuel through the fuel pipe.

At block 1124, the fuel flow control circuitry 212 determines whether to continue operating. To continue operating, the operations 1100 return to block 1102. Otherwise, the operations 1100 terminate.

FIG. 12 is a flowchart representative of example machine readable instructions and/or example operations 1200 that may be executed and/or instantiated by processor circuitry to compute and control a flow rate of fuel in a fuel pipe having a first flow-metering section positioned within a second flow-metering section. The machine readable instructions and/or the operations 1200 of FIG. 12 begin at block 1202, at which the fuel flow control circuitry 212 (FIGS. 2-8 and 10) obtains a desired power output for the gas turbine (e.g., the gas turbine 200 of FIG. 2). In some examples, the power configuration circuitry 1010 (FIG. 10) determines the desired power output based on one or more signals from the sensor(s) 1005 (FIG. 10). For example, the signal(s) from the sensor(s) 1005 can correspond to a position of a throttle lever indicative of the desired power output.

At block 1204, the fuel flow control circuitry 212 identifies a target fuel flow rate associated with the desired power output. For example, the power configuration circuitry 1010 can identify the target fuel flow rate in a fuel pipe (e.g., the fuel circuit 210 of FIG. 2, the fuel pipe(s) 302, 402, 502 of FIGS. 3, 4, 5A, and 5B, etc.) associated with the desired power output in the fuel flow database 1030. In some examples, the power configuration circuitry 1010 determines the target fuel flow rate for a particular fuel pipe (e.g., the first branch 506, the second branch 508, etc.) based on an area of the combustor in fluid connection with (e.g., fluidly coupled to) the particular fuel pipe.

At block 1206, the fuel flow control circuitry 212 obtains pressure measurements from the sensor(s) 1005. For example, the sensor(s) 1005 can measure a first pressure in a first portion of a fuel pipe that has a first cross-sectional area. Further, the sensor(s) 1005 can measure a second pressure in a second portion of the fuel pipe that has a second cross-sectional area smaller than the first cross-sectional area. Additionally, the sensor(s) 1005 can measure a third pressure in a third portion of the fuel pipe that has a third cross-sectional area smaller than the second cross-sectional area. Specifically, the first and second portions of the fuel pipe can be defined by an outer flow-metering section and the third portion of the fuel pipe can be defined by an inner flow-metering section. In some examples, the sensor(s) 1005 measure a pressure differential between the first and second portions of the fuel pipe and/or the first and third portions of the fuel pipe. Further, the flow rate computation circuitry 1015 (FIG. 10) can receive the first, second, and third pressures or the pressure differentials from the sensor(s) 1005.

At block 1208, the fuel flow control circuitry 212 obtains a temperature measurement of the fuel in the fuel pipe. For example, the sensor(s) 1005 can measure the temperature of the fuel in the fuel pipe. Further, the flow rate computation circuitry 1015 can receive the temperature measurement from the sensor(s) 1005.

At block 1210, the fuel flow control circuitry 212 computes a first flow rate of the fuel in the fuel pipe. For example, the flow rate computation circuitry 1015 can compute the first flow rate based on the measured first pressure and the measured third pressure or the pressure differential between the first and third portions of the fuel pipe as well as the measured temperature of the fuel. Further, the flow rate computation circuitry 1015 can compute the first flow rate based on the first cross-sectional area, the third cross-sectional area, and the fourth cross-sectional area. Specifically, the flow rate computation circuitry 1015 utilizes Equation (2) described herein to compute the first flow rate based on the measured pressures and temperature of the fuel as well as the cross-sectional areas through which the fuel flows.

At block 1212, the fuel flow control circuitry 212 compares the computed first flow rate to a first flow rate threshold. Specifically, the first flow rate threshold can correspond to a flow rate at which the fuel flow through the inner flow-metering section becomes choked (e.g., is greater than or equal to the speed of sound). In some examples, the flow rate comparison circuitry 1020 (FIG. 10) performs a comparison between the computed first flow rate to the first flow rate threshold.

At block 1214, the fuel flow control circuitry 212 determines whether the computed first flow rate satisfies (e.g., is greater than) the first flow rate threshold. For example, the flow rate comparison circuitry 1020 can determine whether the computed first flow rate satisfies the first flow rate threshold based on the comparison. In response to the computed first flow rate satisfying (e.g., being less than) the first flow rate threshold, the operations proceed to block 1216, and the computed first flow rate is utilized to determine whether any fuel flow adjustments are needed based on the desired power output. Otherwise, in response to the computed first flow rate not satisfying (e.g., being greater than) the first flow rate threshold, the operations proceed to block 1228.

At block 1216, the fuel flow control circuitry 212 compares the computed first flow rate to a second flow rate threshold (e.g., an upper flow rate threshold). For example, the flow rate comparison circuitry 1020 can perform a comparison between the computed first flow rate and the second flow rate threshold. In some examples, the flow rate comparison circuitry 1020 determines the second flow rate threshold and a third flow rate threshold based on the target flow rate associated with the desired power output. For example, the flow rate comparison circuitry 1020 can set an upper limit and a lower limit on flow rates within an acceptable range of the target flow rate.

At block 1218, the fuel flow control circuitry 212 determines whether the computed first flow rate of the fuel satisfies (e.g., is less than) the second flow rate threshold. For example, the flow rate comparison circuitry 1020 can determine the flow rate satisfies the second flow rate threshold in response to the computed first flow rate being less than or equal to an upper (i.e., maximum) tolerance limit of the target flow rate associated with the desired power output. In response to the flow rate of the fuel satisfying the second flow rate threshold, the operations 1200 skip to block 1222. Otherwise, in response to the flow rate of the fuel not satisfying the second flow rate threshold, the operations 1200 proceed to block 1220.

At block 1220, the fuel flow control circuitry 212 causes the flow rate of the fuel in the fuel pipe to be reduced. For example, the actuation control circuitry 1025 can cause the actuator(s) 1035 to reduce the flow rate of the fuel in the fuel pipe. In some examples, the actuation control circuitry 1025 causes the actuator(s) 1035 to at least partially close a fuel metering valve to reduce the flow rate of the fuel. In some examples, the actuation control circuitry 1025 causes the actuator(s) 1035 to reduce a rate at which a fuel pump drives the fuel through the fuel pipe. In response to reducing the flow rate of the fuel in the fuel pipe, the operations 1200 skip to block 1242.

At block 1222, the fuel flow control circuitry 212 compares the computed first flow rate of the fuel in the fuel pipe to the third flow rate threshold. For example, the flow rate comparison circuitry 1020 can compare the computed first flow rate to the third flow rate threshold defined based on the desired power output.

At block 1224, the fuel flow control circuitry 212 determines whether the first computed flow rate of the fuel satisfies (e.g., is greater than) the third flow rate threshold. For example, the flow rate comparison circuitry 1020 can determine the first computed flow rate satisfies the third flow rate threshold in response to the computed first flow rate being less than or equal to an upper (i.e., maximum) tolerance limit of the target flow rate associated with the desired power output. In response to the computed first flow rate of the fuel satisfying the third flow rate threshold, the operations 1200 skip to block 1242. Otherwise, in response to the flow rate of the fuel not satisfying the third flow rate threshold, the operations 1200 proceed to block 1226.

At block 1226, the fuel flow control circuitry 212 causes the flow rate in the fuel pipe to be increased. For example, the actuation control circuitry 1025 can cause the actuator(s) 1035 to increase the flow rate of the fuel in the fuel pipe. In some examples, the actuation control circuitry 1025 causes the actuator(s) 1035 to at least partially open the fuel metering valve to increase the flow rate of the fuel in the fuel pipe. In some examples, the actuation control circuitry 1025 causes the actuator(s) 1035 to increase a rate at which the fuel pump drives the fuel through the fuel pipe.

At block 1228, the fuel flow control circuitry 212 computes a second flow rate of the fuel in the fuel pipe. For example, in response to the first computed flow rate not satisfying (e.g., being greater than or equal to) the first flow rate threshold, the flow rate computation circuitry 1015 can compute the second flow rate based on the measured first pressure and the measured second pressure or the pressure differential between the first and second portions of the fuel pipe as well as the measured temperature of the fuel. Further, the flow rate computation circuitry 1015 can compute the first flow rate based on the first cross-sectional area of the first portion of the fuel pipe and the second cross-sectional area of the second portion of the fuel pipe. Specifically, the flow rate computation circuitry 1015 utilizes Equation (3) to compute the second flow rate based on the measured pressures and temperature of the fuel as well as the cross-sectional areas through which the fuel flows when flow through the inner flow-metering section in the fuel pipe is choked.

At block 1230, the fuel flow control circuitry 212 compares the second computed flow rate to the second flow rate threshold. For example, the flow rate comparison circuitry 1020 can perform a comparison between the second computed flow rate and the second flow rate threshold.

At block 1232, the fuel flow control circuitry 212 determines whether the second computed flow rate satisfies (e.g., is less than) the second flow rate threshold. For example, the flow rate comparison circuitry 1020 can determine the flow rate satisfies the second flow rate threshold in response to the second computed flow rate being less than or equal to the upper (i.e., maximum) tolerance limit of the target flow rate associated with the desired power output. In response to the second computed flow rate of the fuel satisfying the second flow rate threshold, the operations 1200 skip to block 1222. Otherwise, in response to the flow rate of the fuel not satisfying the second flow rate threshold, the operations 1200 proceed to block 1236.

At block 1234, the fuel flow control circuitry 212 causes the flow rate of the fuel in the fuel pipe to decrease. For example, the actuation control circuitry 1025 can cause the actuator(s) 1035 to reduce the flow rate of the fuel in the fuel pipe.

At block 1236, the fuel flow control circuitry 212 compares the second computed flow rate to the third flow rate threshold. For example, the flow rate comparison circuitry 1020 can perform a comparison between the second computed flow rate and the third flow rate threshold.

At block 1238, the fuel flow control circuitry 212 determines whether the second computed flow rate satisfies (e.g., is greater than) the third flow rate threshold. For example, the flow rate comparison circuitry 1020 can determine whether the second computed flow rate satisfies the third flow rate threshold based on the comparison. In response to the second computed flow rate satisfying the third flow rate threshold, the operations 1200 skip to block 1242. Otherwise, in response to the second computed flow rate not satisfying the third flow rate threshold, the operations 1200 proceed to block 1240.

At block 1240, the fuel flow control circuitry 212 causes the flow rate of the fuel in the fuel pipe to increase. For example, the actuation control circuitry 1025 can cause the actuator(s) 1035 to increase the flow rate of the fuel in the fuel pipe.

At block 1242, the fuel flow control circuitry 212 determines whether to continue operating. To continue operating, the operations 1200 return to block 1202. Otherwise, the operations 1200 terminate.

Figure 13:
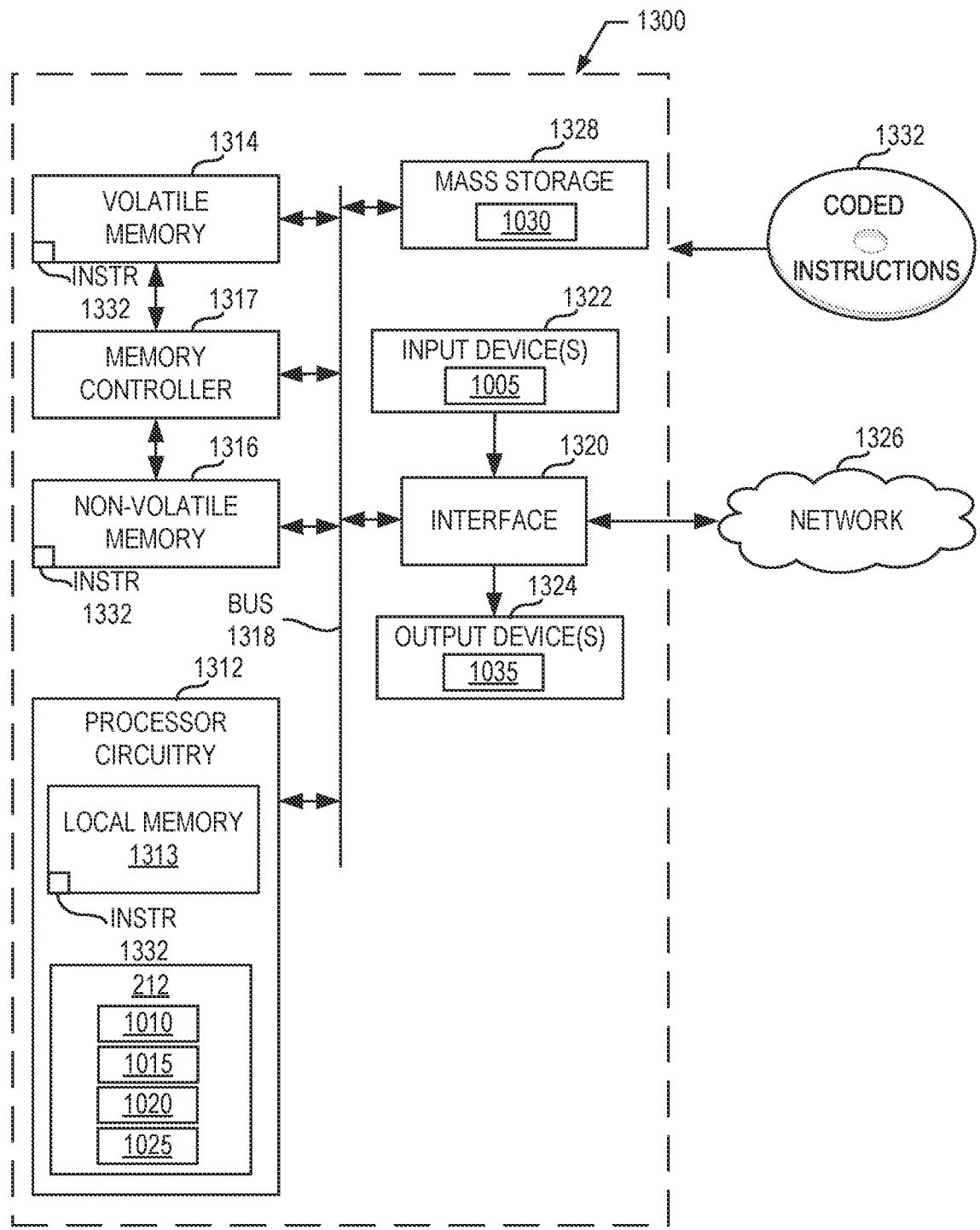
FIG. 13 is a block diagram of an example processing platform including processor circuitry structured to execute the example machine readable instructions and/or the example operations of FIGS. 11 and/or 12 to implement the fuel flow control circuitry 212 of FIGS. 2-8 and 10.

FIG. 13 is a block diagram of an example processor platform 1300 structured to execute and/or instantiate the machine readable instructions and/or the operations of FIGS. 11 and/or 12 to implement the fuel flow control circuitry 212 of FIGS. 2-8 and 10. The processor platform 1300 can be, for example, a digital computer (e.g., a FADEC, an EEC, an ECU, etc.) or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the fuel flow control circuitry 212, the power configuration circuitry 1010, the flow rate computation circuitry 1015, the flow rate comparison circuitry 1020, and the actuation control circuitry 1025.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a pressure sensor, a temperature sensor, a position sensor, a microphone, a camera (still or video), a keyboard, a button, a mouse, a touchscreen, a track-pad, a trackball, an isopoint device, and/or a voice recognition system. In this examples, the input device(s) implement the sensors 1005.

One or more output devices 1324 are also connected to the interface circuitry 1320 of the illustrated example. The output device(s) 1324 can be implemented, for example, by an actuator(s), display devices, etc. In this example, the output device(s) 1324 implement the actuator(s) 1035. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, Airband or aircraft band radio, satellite, a digital datalink system (e.g., Aircraft Communications Addressing and Reporting System (ACARS)), etc.

The processor platform 1300 of the illustrated example also includes one or more mass storage devices 1328 to store software and/or data. Examples of such mass storage devices 1328 include magnetic storage devices, optical storage devices, floppy disk drives, HDDs, redundant array of independent disks (RAID) systems, solid state storage devices such as flash memory devices and/or SSDs, and DVD drives.

The machine readable instructions 1332, which may be implemented by the machine readable instructions of FIGS. 11 and/or 12, may be stored in the mass storage device 1328, in the volatile memory 1314, in the non-volatile memory 1316, and/or on a removable non-transitory computer readable storage medium such as a CD or DVD.

From the foregoing, it will be appreciated that example systems, methods, apparatus, and articles of manufacture have been disclosed that enable a flow rate of a compressible fuel to be calculated based on pressures encountered by the fuel, cross-sectional areas through which the fuel was flowing when encountering the pressures, and/or a temperature of the fuel. As such, the direct flow rate calculation enables more rapid adjustments to a valve position and/or a pump drive to enable the fuel to reach a combustor at a certain rate that produces a desired power output. Moreover, the direct flow rate calculation reduces an operating burden on the fuel system as high pressures associated with choked flow can be avoided or reduced.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Further aspects of the present disclosure are provided by the subject matter of the following clauses:

Example 1 is an apparatus comprising a pipe defining a flow path for fuel, the pipe fluidly coupled to a combustor, a first portion of the pipe having a first cross-sectional area, a second portion of the pipe having a second cross-sectional area smaller than the first cross-sectional area, the second portion downstream of the first portion, and an actuator to adjust a flow rate of the fuel in the pipe based on a first pressure of the fuel in the first portion of the pipe and a second pressure of the fuel in the second portion of the pipe.

Example 2 includes the apparatus of any preceding clause, further including a metering valve positioned in the pipe upstream of the first portion of the pipe, the metering valve operatively coupled to the actuator, and a controller communicatively coupled to the actuator, the controller to cause the actuator to at least partially open the metering valve in response to the flow rate satisfying a first flow rate threshold, and cause the actuator to at least partially close the metering valve in response to the flow rate satisfying a second flow rate threshold.

Example 3 includes the apparatus of any preceding clause, wherein the pipe is positioned in at least one of a compressor section or a turbine section.

Example 4 includes the apparatus of any preceding clause, further including at least one sensor to measure the first pressure and the second pressure.

Example 5 includes the apparatus of any preceding clause, wherein the pipe is a first pipe, further including a second pipe positioned around the first pipe.

Example 6 includes the apparatus of any preceding clause, wherein the second pipe has a uniform cross-sectional area.

Example 7 includes the apparatus of any preceding clause, wherein the second pipe includes a third portion and a fourth portion downstream of the third portion, the third portion of the second pipe having a third cross-sectional area, the fourth portion of the second pipe having a fourth cross-sectional area smaller than the third cross-sectional area.

Example 8 includes the apparatus of any preceding clause, wherein the first pipe includes an outlet positioned in the fourth portion of the second pipe.

Example 9 includes the apparatus of any preceding clause, further including a metering valve operatively coupled to the actuator, and a controller communicatively coupled to the actuator, the controller to cause the actuator to adjust the metering valve based on the first pressure and the second pressure in response to the flow rate not satisfying a flow rate threshold, and cause the actuator to adjust the metering valve based on the first pressure and a third pressure in the fourth portion of the second pipe in response to the flow rate satisfying the flow rate threshold.

Example 10 includes the apparatus of any preceding clause, wherein the pipe is a first pipe, further including a second pipe connected in parallel with the first pipe, the second pipe including a third portion and a fourth portion downstream of the third portion, the third portion of the second pipe including the first cross-sectional area or a third cross-sectional area, the fourth portion of the second pipe including the second cross-sectional area or a fourth cross-sectional area smaller than the third cross-sectional area.

Example 11 includes the apparatus of any preceding clause, wherein the first pipe is fluidly coupled to a first zone of the combustor and the second pipe is fluidly coupled to a second zone of the combustor.

Example 12 includes the apparatus of example 10, wherein the actuator is a first actuator, and the flow rate is a first flow rate in the first pipe, further including a first metering valve positioned in the first pipe upstream of the first portion of the first pipe, the first metering valve operatively coupled to the first actuator, a second metering valve positioned in the second pipe upstream of the first portion of the second pipe, a second actuator operatively coupled to the second metering valve, and a controller communicatively coupled to the first actuator and the second actuator, the controller to cause the first actuator to at least partially open the first metering valve in response to the first flow rate satisfying a first flow rate threshold, cause the first actuator to at least partially close the first metering valve in response to the first flow rate satisfying a second flow rate threshold, cause the second actuator to at least partially open the second metering valve in response to a second flow rate in the second pipe satisfying the first flow rate threshold or a third flow rate threshold, and cause the second actuator to at least partially close the second metering valve in response to the second flow rate satisfying the second flow rate threshold or a fourth flow rate threshold.

Example 13 includes the apparatus of any preceding clause, wherein the pipe includes a first segment and a second segment downstream of the first segment, the first segment including the first portion and the second portion, the second segment including a third portion of the pipe and a fourth portion of the pipe downstream of the third portion, the third portion of the pipe including the first cross-sectional area or a third cross-sectional area, the fourth portion of the pipe including the second cross-sectional area or a fourth cross-sectional area smaller than the third cross-sectional area.

Example 14 includes the apparatus of any preceding clause, wherein the fuel is compressible.

Example 15 includes the apparatus of any preceding clause, wherein the fuel is in a gaseous state or a supercritical state.

Example 16 includes the apparatus of any preceding clause, wherein the first cross-sectional area and the second cross-sectional area are positioned in a core of a gas turbine associated with the combustor.

Example 17 is a gas turbine comprising a pipe to transport a fuel to a combustor, the pipe including a first cross-sectional area upstream of a second cross-sectional area to cause the fuel to have a first pressure in a first portion of the pipe and a second pressure in a second portion of the pipe, a valve coupled to the pipe and positioned upstream of at least one of the first portion of the pipe or the second portion of the pipe, and processor circuitry to determine a position for the valve based on the first pressure and the second pressure.

Example 18 includes the gas turbine of any preceding clause, further including a first pressure sensor to measure the first pressure, a second pressure sensor to measure the second pressure, and a temperature sensor to measure a temperature of the fuel in the pipe, the processor circuitry to calculate a flow rate based on the first pressure, the second pressure, and the temperature of the fuel, the processor circuitry to determine the position for the valve based on the flow rate.

Example 19 includes the gas turbine of any preceding clause, wherein the valve is a spool-in-sleeve valve, a poppet valve, or a butterfly valve.

Example 20 is an apparatus, comprising means for transporting a fluid to a combustor, means for causing a pressure difference in the means for transporting, and means for adjusting a flow rate in the means for transporting based on the pressure difference.

Example 21 includes the apparatus of any preceding clause, further including means for monitoring a first fluid pressure in a first portion of the means for transporting and a second fluid pressure in a second portion of the means for transporting, the pressure difference corresponding to the first fluid pressure and the second fluid pressure.

Example 22 includes the apparatus of any preceding clause, wherein the means for monitoring is a first means for monitoring, the means for causing is a first means for causing, and the pressure difference is a first pressure difference, further including a second means for causing a second pressure difference, and second means for monitoring a third fluid pressure and a fourth fluid pressure associated with the second pressure difference, the means for adjusting to adjust the flow rate based on at least one of the first pressure difference or the second pressure difference.

Example 23 includes the apparatus of any preceding clause, wherein the pipe is a first pipe, further including a second pipe and a third pipe connected in parallel with the first pipe, the second pipe including a third portion and a fourth portion downstream of the third portion, the third portion of the second pipe including the first cross-sectional area or a third cross-sectional area, the fourth portion of the second pipe including the second cross-sectional area or a fourth cross-sectional area smaller than the third cross-sectional area, the third pipe including a fifth portion and a sixth portion downstream of the fifth portion, the fifth portion of the third pipe including the first cross-sectional area or the third cross-sectional area, the sixth portion of the third pipe including the second cross-sectional area or the fourth cross-sectional area, the first pipe fluidly coupled to a first zone of the combustor, the second pipe fluidly coupled to a second zone of the combustor, and the third pipe fluidly coupled to a third zone of the combustor.

Example 24 is a non-transitory machine readable storage medium comprising instructions that, when executed, cause processor circuitry to at least: obtain a desired power output, identify a target fuel flow rate associated with the desired power, obtain pressure measurements in a first cross-sectional area of a fuel pipe and a second cross-sectional area downstream of the first cross-sectional area and smaller than the first cross-sectional area, obtain a temperature measurement, compute a fuel flow rate based on the pressure measurements and the temperature measurement, compare the fuel flow rate to a first flow rate threshold, in response to the first flow rate threshold being satisfied by the fuel flow rate, reduce the fuel flow rate, in response to the first flow rate threshold not being satisfied, compare the fuel flow rate to a second flow rate threshold, and in response to the second flow rate threshold being satisfied, increase the fuel flow rate.

Example 25 is a non-transitory machine readable storage medium comprising instructions that, when executed, cause processor circuitry to at least: obtain a desired power output, identify a target fuel flow rate associated with the desired power, obtain at least one of (i) a first pressure of a fuel in a first cross-sectional area of a fuel pipe, (ii) a second pressure of the fuel in a second cross-sectional area of the fuel pipe downstream of the first cross-sectional area and smaller than the first cross-sectional area, or (ii) a third pressure of the fuel in a third cross-sectional area of the fuel pipe downstream of the second cross-sectional area, the third cross-sectional area larger than the second cross-sectional area and smaller than the first cross-sectional area, obtain a temperature measurement, compute a first fuel flow rate calculation based on the first pressure, the third pressure, and the temperature measurement, compare the first fuel flow rate calculation to a first flow rate threshold, in response to the first fuel flow rate calculation satisfying the first flow rate threshold, compare the first fuel flow rate calculation to a second flow rate threshold, in response to the first fuel flow rate calculation not satisfying the second flow rate threshold, cause a flow rate of the fuel to decrease, in response to the first fuel flow rate calculation satisfying the second flow rate threshold, compare the first fuel flow rate calculation to a third flow rate threshold, in response to the first fuel flow rate calculation not satisfying the third flow rate threshold, cause the flow rate of the fuel to increase, in response to the first fuel flow rate calculation not satisfying the first flow rate threshold, compute a second fuel flow rate calculation based on the first pressure, the second pressure, and the temperature, compare the second fuel flow rate calculation to a fourth flow rate threshold, in response to the second fuel flow rate calculation not satisfying the fourth flow rate threshold, cause the flow rate of the fuel to decrease, in response to the second fuel flow rate calculation satisfying the fourth flow rate threshold, compare the second fuel flow rate calculation to a fifth flow rate threshold, and in response to the second fuel flow rate calculation not satisfying the fifth flow rate threshold, cause the flow rate of the fuel to increase.

What is claimed is:

1. An apparatus comprising:
   a first pipe defining a first flow path for fuel, the first pipe fluidly coupled to a combustor, a first portion of the first pipe having a first cross-sectional area, a second portion of the first pipe having a second cross-sectional area smaller than the first cross-sectional area, the second portion downstream of the first portion;
   a second pipe positioned around the first pipe, the second pipe defining a second flow path for the fuel, the second flow path to enable a portion of the fuel to flow past the first pipe outside of the first flow path; and
   an actuator to adjust a flow rate of the fuel in the first pipe based on a first pressure of the fuel in the first portion of the first pipe, a second pressure of the fuel in the second portion of the first pipe, and a temperature of the fuel.

2. The apparatus of claim 1, further including:
   a metering valve positioned in the second pipe upstream of the first pipe, the metering valve operatively coupled to the actuator; and
   a controller communicatively coupled to the actuator, the controller to:
      cause the actuator to at least partially open the metering valve in response to the flow rate satisfying a first flow rate threshold; and
      cause the actuator to at least partially close the metering valve in response to the flow rate satisfying a second flow rate threshold.

3. The apparatus of claim 1, wherein the first pipe is positioned in at least one of a compressor section or a turbine section.

4. The apparatus of claim 1, further including at least one first sensor to measure the first pressure and the second pressure and a second sensor to measure the temperature.

5. The apparatus of claim 1, wherein the second pipe has a uniform cross-sectional area.

6. The apparatus of claim 1, wherein the second pipe includes a third portion and a fourth portion downstream of the third portion, the third portion of the second pipe having a third cross-sectional area, the fourth portion of the second pipe having a fourth cross-sectional area smaller than the third cross-sectional area.

7. The apparatus of claim 6, wherein the first pipe includes an outlet positioned in the fourth portion of the second pipe.

8. The apparatus of claim 7, further including:
   a metering valve operatively coupled to the actuator; and
   a controller communicatively coupled to the actuator, the controller to:
      cause the actuator to adjust the metering valve based on the first pressure and the second pressure in response to the flow rate not satisfying a flow rate threshold; and
      cause the actuator to adjust the metering valve based on the first pressure and a third pressure in the fourth portion of the second pipe in response to the flow rate satisfying the flow rate threshold.

9. The apparatus of claim 1, further including a third pipe connected in parallel with the first pipe, the third pipe including a third portion and a fourth portion downstream of the third portion, the third portion of the third pipe including the first cross-sectional area or a third cross-sectional area, the fourth portion of the third pipe including the second cross-sectional area or a fourth cross-sectional area smaller than the third cross-sectional area.

10. The apparatus of claim 9, wherein the first pipe is fluidly coupled to a first zone of the combustor and the third pipe is fluidly coupled to a second zone of the combustor.

11. The apparatus of claim 9, wherein the actuator is a first actuator, and the flow rate is a first flow rate in the first pipe, further including:
   a first metering valve positioned in the second pipe upstream of the first portion of the first pipe, the first metering valve operatively coupled to the first actuator;
   a second metering valve positioned in the third pipe upstream of the third portion of the third pipe;
   a second actuator operatively coupled to the second metering valve; and
   a controller communicatively coupled to the first actuator and the second actuator, the controller to:
      cause the first actuator to at least partially open the first metering valve in response to the first flow rate satisfying a first flow rate threshold;
      cause the first actuator to at least partially close the first metering valve in response to the first flow rate satisfying a second flow rate threshold;
      cause the second actuator to at least partially open the second metering valve in response to a second flow rate in the third pipe satisfying the first flow rate threshold or a third flow rate threshold; and
      cause the second actuator to at least partially close the second metering valve in response to the second flow rate satisfying the second flow rate threshold or a fourth flow rate threshold.

12. The apparatus of claim 1, wherein the second pipe includes a first segment and a second segment downstream of the first segment, the first segment positioned around the first pipe, the second segment including a third portion of the second pipe and a fourth portion of the second pipe downstream of the third portion, the third portion of the second pipe including a third cross-sectional area, the fourth portion of the second pipe including a fourth cross-sectional area smaller than the third cross-sectional area.

13. The apparatus of claim 1, wherein the first cross-sectional area and the second cross-sectional area are positioned in a core of a gas turbine associated with the combustor.

14. A gas turbine comprising:
a first pipe to transport a fuel towards a combustor, the first pipe including a first cross-sectional area upstream of a second cross-sectional area to cause the fuel to have a first pressure in a first portion of the first pipe and a second pressure in a second portion of the first pipe;
a second pipe positioned around the first pipe, a cross-section of the second pipe including the first pipe, a first portion of the fuel in the cross-section positioned inside the first pipe, a second portion of the fuel in the cross-section positioned outside of the first pipe;
a valve coupled to the second pipe and positioned upstream of at least one of the first portion of the first pipe or the second portion of the first pipe; and
processor circuitry to determine a position for the valve based on the first pressure and the second pressure.

15. The gas turbine of claim 14, further including:
a first pressure sensor to measure the first pressure;
a second pressure sensor to measure the second pressure; and
a temperature sensor to measure a temperature of the fuel in the second pipe, the processor circuitry to calculate a flow rate based on the first pressure, the second pressure, and the temperature of the fuel, the processor circuitry to determine the position for the valve based on the flow rate.

16. The gas turbine of claim 14, wherein the valve is a spool-in-sleeve valve, a poppet valve, a gate valve, a ball valve, or a butterfly valve.

17. The apparatus of claim 14, wherein the second pipe includes a third portion and a fourth portion, the third portion positioned around an inlet of the first pipe, the fourth portion positioned around an outlet of the first pipe, the third portion including a third cross-sectional area, the fourth portion including a fourth cross-sectional area smaller than the third cross-sectional area.

18. An apparatus, comprising:
first means for transporting a fluid towards a combustor;
means for causing a pressure difference in the first means for transporting;
second means for transporting the fluid towards the combustor, the second means for transporting positioned around the first means for transporting to enable a first portion of the fluid in a cross-section of the second means for transporting to flow inside the first means for transporting and a second portion of the fluid to flow outside the first means for transporting in the cross-section; and
means for adjusting a flow rate in the second means for transporting based on the pressure difference.

19. The apparatus of claim 18, further including means for monitoring a first fluid pressure in a first portion of the first means for transporting and a second fluid pressure in a second portion of the first means for transporting, the pressure difference corresponding to the first fluid pressure and the second fluid pressure.

20. The apparatus of claim 19, wherein the means for monitoring is a first means for monitoring, the means for causing is a first means for causing, and the pressure difference is a first pressure difference, further including a second means for causing a second pressure difference, and second means for monitoring a third fluid pressure and a fourth fluid pressure associated with the second pressure difference, the means for adjusting to adjust the flow rate based on at least one of the first pressure difference or the second pressure difference.

* * * * *